United States Patent [19]
Zucker

[11] Patent Number: 6,047,362
[45] Date of Patent: Apr. 4, 2000

[54] DELAYED REMOVAL OF ADDRESS MAPPING FOR TERMINATED PROCESSES

[75] Inventor: J. Steven Zucker, Manhattan Beach, Calif.

[73] Assignee: Sun Microsystems, Inc., Palo Alto, Calif.

[21] Appl. No.: 08/744,447

[22] Filed: Nov. 8, 1996

Related U.S. Application Data

[62] Division of application No. 08/269,035, Jun. 30, 1994, Pat. No. 5,835,743.

[51] Int. Cl.[7] .............................. G06F 12/10; G06F 12/12

[52] U.S. Cl. ..................... 711/203; 711/206; 711/156; 711/159; 711/134; 711/133

[58] Field of Search ..................................... 711/156, 158, 711/159, 202, 203, 206, 207, 208, 209, 133, 135, 139

[56] References Cited

U.S. PATENT DOCUMENTS

| | | | |
|---|---|---|---|
| 4,068,303 | 1/1978 | Morita | 711/207 |
| 4,758,951 | 7/1988 | Sznyter, III | 711/206 |
| 4,812,969 | 3/1989 | Takagi et al. | 711/207 |
| 4,910,668 | 3/1990 | Okamoto et al. | 711/207 |
| 5,301,288 | 4/1994 | Newman et al. | 711/202 |
| 5,329,627 | 7/1994 | Nanda et al. | 711/207 |
| 5,559,980 | 9/1996 | Connors et al. | 711/202 |
| 5,899,994 | 5/1999 | Mohamed et al. | 711/206 |

*Primary Examiner*—Reginald G. Bragdon
*Attorney, Agent, or Firm*—Arter & Hadden LLP; David G. Alexander

[57] ABSTRACT

An application binary interface includes linkage structures for interfacing a binary application program to a digital computer. Virtual address spaces are allocated for processes respectively. Page table entries for translation of the virtual address spaces into physical addresses are not removed as processes terminate, but only after all virtual address spaces have been allocated.

32 Claims, 11 Drawing Sheets

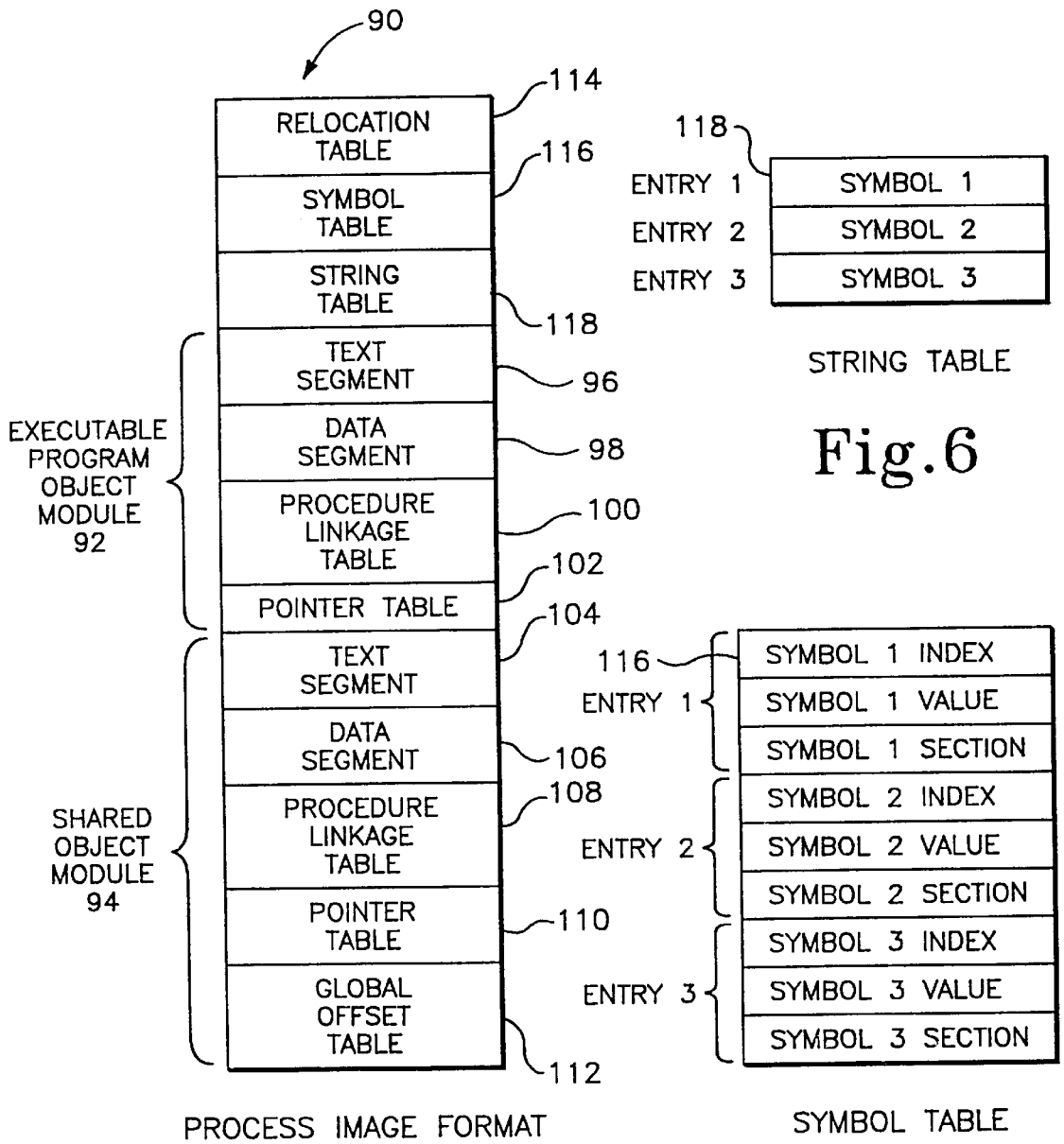

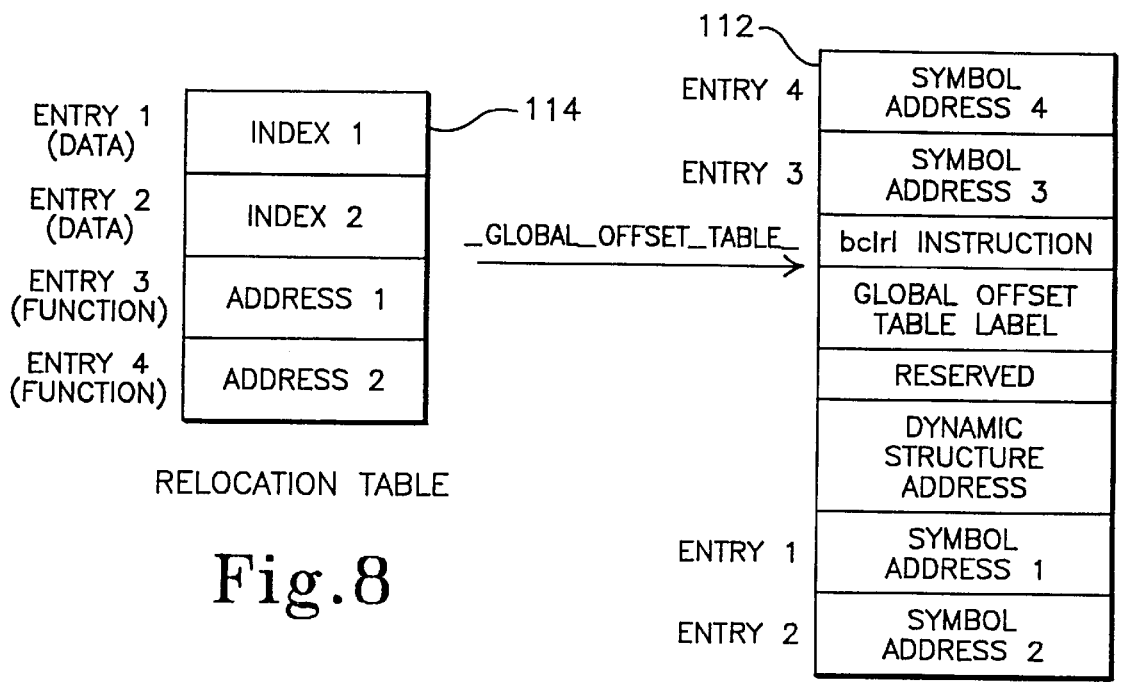
Fig.8
Fig.9
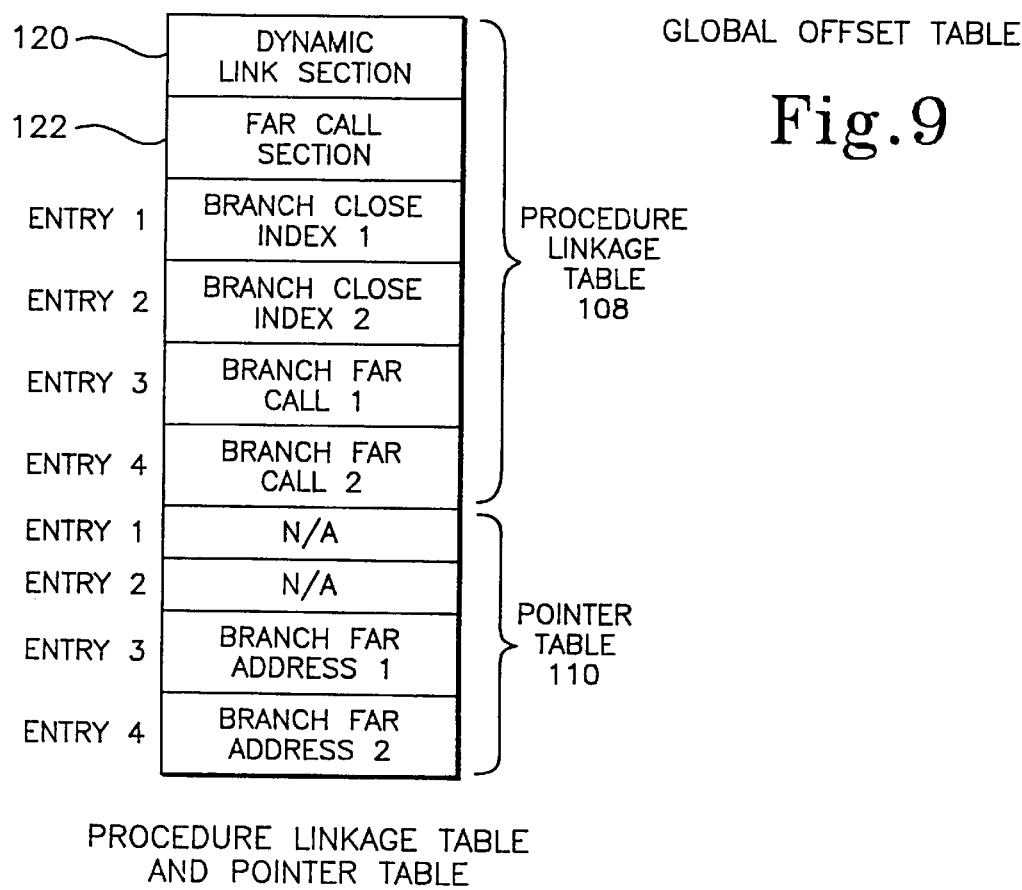
Fig.10

USAGE TABLE

DELAYED REMOVAL OF ADDRESS MAPPING FOR TERMINATED PROCESSES

REFERENCE TO RELATED APPLICATION

This application is a division of U.S. patent application Ser. No. 08/269,035, entitled APPLICATION BINARY INTERFACE AND METHOD OF INTERFACING BINARY APPLICATION PROGRAM TO DIGITAL COMPUTER, filed Jun. 30, 1994 by J. Steven Zucker, now U.S. Pat. No. 5,835,743, issued Nov. 10, 1998.

BACKGROUND OF THE INVENTION

1. Field of the Invention

The present invention generally relates to the art of digital computers, and more specifically to an Application Binary Interface (ABI), a structure and method of interfacing a binary application program to a digital computer system.

2. Description of the Related Art

An application binary interface includes linkage structures by which a user written and compiled binary application program can interface with a specific digital computer and operating system. In order to set out the background of the present invention, for illustrative purposes, the following description relates to a Motorola PowerPC 601 Reduced Instruction Set Computer (RISC) microprocessor running under the UNIX System V, Release 4, operating system (PowerPC is a trademark of International Business Machines Corporation, Unix is a registered trademark of UNIX System Laboratories, Inc.).

The disclosed arrangement is also applicable to the Solaris operating system running on the PowerPC microprocessor (Solaris is a trademark of Sun Microsystems, Inc.). It will be understood, however, that the present invention is applicable to any computer architecture having suitable characteristics and is not limited to any specific computer or combination of processor and operating system.

In recent years, an application binary interface has been developed for the UNIX System V operating system for most commercially available microprocessors. These interfaces include generic sections which are applicable to all processor architectures, and other sections which are specific to each processor.

Several aspects of the PowerPC architecture have not lent themselves well to the conventional solutions utilized in the prior art relating to other processors. These aspects include the following:

1. Acquisition of Global Offset Table (GOT) Pointer

Machine code instructions in powerful microprocessors such as the PowerPC RISC instruction set are generally of two types, position-dependent and position-independent. Position-dependent instructions can include absolute addresses. To execute properly, a module containing position dependent machine code must be loaded at a specific virtual address, in order to make the program's absolute addresses coincide with the process's virtual addresses.

Position-independent (also called relocatable code) instructions typically include relative addresses, but not absolute addresses. Consequently, the code is not fixed to a specific load address. This allows a position-independent code module to execute properly at various positions in virtual memory.

When a process image is determined by the system, the executable file containing the main program portion of the process (position-dependent) may have fixed addresses, and the system chooses object library virtual addresses to avoid conflicts with other segments in the process.

To maximize text sharing, shared objects conventionally use position-independent code. Shared object text segments can be loaded at various virtual addresses without having to change the segment images. Thus, multiple processes can share a single shared object text segment, even if the segment resides at a different virtual address in each process.

Instructions that reference memory typically require a base address in a general purpose register, and an offset or displacement field in the instruction or an index value in a second general purpose register. On the PowerPC, the offset is a signed 16-bit quantity. Therefore, absolute addressing of the entire virtual address space (which is typically 32 bits) is not possible. Relative branching is also limited to a range of ±32 megabytes from a branch instruction by the limited offsets in these instructions.

Since an address must be loaded into a register to perform any type of memory access in the PowerPC architecture, a Global Offset Table (GOT) is provided in each position-independent shared object module in the process image. The GOT contains addresses of global data such as constants and variables that are identified by symbols and are located outside the module.

The global offset table stores the absolute virtual addresses of these data, and data within it is referenced by adding the absolute base addresses of the global offset table (GOT pointer) and the index or relative offset of the data into the table. This method enables the module to load the absolute address of a data item into appropriate registers and read or write the data from.memory using a conventional RISC relative address read or write instruction.

In order for a module to access its global offset table, it is necessary to know the absolute. base address of the table. However, PowerPC instructions cannot contain absolute code, and must access memory through registers as described above.

The prior art method for loading the GOT uses the equivalent of a branch and link to the next instruction followed by moving the saved address to a register, followed by adding the difference between the address of the GOT and the address of the instruction to the register. On the PowerPC, this requires four instructions.

2. Calls to Functions in Shared Object Modules

Much as the global offset table redirects position-independent address calculations to absolute locations, the application binary interface comprises a procedure linkage table (PLT) which redirects position-independent function calls to absolute locations. A link editor, also known as a static linker, cannot resolve execution transfers (such as function calls) from one executable or shared object module to another. Consequently, the link editor arranges to have the program transfer control to entries in the procedure linkage table.

At run time, the dynamic linker determines the destination's absolute address and modifies the procedure linkage table's memory image accordingly. The dynamic linker can thus redirect the entries without compromising the position-independence and shareability of the program's text. Position-dependent executable files and position-independent shared object files have separate procedure linkage tables.

Modifying an entry in a conventional procedure linkage table involves changing more than one instruction. This must be done in a specific order, and constitutes a non-atomic operation. If one instruction is changed but not the others, the instruction sequence becomes invalid. This can occur if the dynamic linker is modifying the entry, and a call from another processor or asynchronous event handling code is made through the same entry. This situation is known in the art as re-entrancy.

3. Variable Argument List Function Calls

Variable argument list functions are generally designated as "varargs" functions in the C programming language. The prime example of a variable argument list function is "printf", which causes specified data to be output to a monitor screen, printer or the like.

A calling process can pass a variable number of arguments of different types to a varargs function, the arguments being broadly classifiable as "floating point" and "non-floating point". The PowerPC microprocessor comprises a large number, (more specifically thirty-two), of 64-bit floating point resisters FPR in addition to the floating-point status and control register FPSCR.

In the prior art, a calling function does not tell the varargs functions whether or not floating point arguments are passed. Therefore, the varargs function itself must save the floating point argument registers because floating point arguments might have been passed. This operation constitutes a waste of operating time if the varargs function does not actually pass floating point arguments.

Also in prior art, a program will incidently acquire a floating point state merely because it calls a varargs function, even though it never "constructively" uses floating point. In such a case, the operating system must store the entire floating point state (all of the floating point registers) when operation is switched to another task, and restore the floating point state when it is called again. This operation also constitutes a waste of operating time if the program does not actually use floating point.

4. Removing Address Mappings for Terminated Processes

The PowerPC memory management architecture is unusual several respects. First, it has one large page table containing translations for all address spaces at once rather than having separate page tables for each address space and switching between them on context switches as in conventional designs.

Second, the page table structure itself is different from conventional designs which employ hierarchical page tables, with various portions of the virtual address being used to index into the page tables at various levels.

A virtual address space is assigned to each process that is to be run on the microprocessor, and physical addresses in the processor's memory are mapped to the virtual addresses by a memory management unit. These mappings are implemented as Page Table Entries (PTEs) in the page table.

The page table maps virtual addresses to real addresses. A virtual address consists of a Virtual Segment Identifier (VSID) concatenated with an offset within the segment, and the PTE for a given offset within a given VSID is obtained by hashing the offset/VSID and searching the indicated portion of the page table.

After processes have been terminated, their corresponding PTEs must be unmapped or removed from the page table to make room for other processes. Due to the manner in which virtual to physical address translation is performed on the PowerPC, unmapping of the PTEs for each process requires that the entire page table be searched for entries having corresponding VSIDs.

The PowerPC includes a 32 bit effective address space (addressable by the program), and a 52 bit virtual address space. Even with the extremely high processing speed of the PowerPC, unmapping of the PTEs for a single process requires a significant fraction of a second. The PTE unmapping operation, if performed in the conventional manner, constitutes unacceptably excessive overhead in the operation of the system.

5. Conclusions

There still exists a need for an application binary interface and memory mapping system that can (1) efficiently acquire the absolute address of the global offset table, (2) efficiently manage linkage to functions in shared object modules without reentrancy problems, (3) support variable argument functions without unnecessarily acquiring floating point state and avoid the unnecessary saving of floating point registers, and (4) avoid high overhead for page table entry deletion at process termination.

The present invention fills this need.

SUMMARY OF THE INVENTION

An Application Binary Interface (ABI) according to the present invention comprises a method and linkage structures for interfacing a binary application program to a digital computer.

Page table entries for translation of virtual address spaces into physical addresses are not unmapped or deleted as processes terminate, but only after all VSIDs have been allocated. This is accomplished by providing a mapping control unit for controlling the memory management unit to select VSIDs for mapping new processes.

An unmapping control unit intermittently controls the memory management unit to unmap physical addresses corresponding to programs that have terminated.

The unmapping control unit unmaps stale entries in a page table after all virtual address spaces have been allocated to processes, thereby ensuring that the unmapping operation will occur only at long intervals such as several days. This aspect of the present application binary interface substantially reduces the overhead associated with memory management and increases the operating speed and efficiency of the system.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 5 is a diagram that similarly illustrates a process image format resulting from loading and statically linking a binary object file and required library functions in virtual memory;

FIG. 6 is a diagram illustrating a string table of the process image of FIG. 5;

FIG. 7 is a diagram similarly illustrating a symbol table of the process image;

FIG. 8 is a diagram illustrating a relocation table;

FIG. 9 is a diagram illustrating global offset table;

FIG. 10 is a diagram illustrating a procedure linkage table and associated pointer table;

DETAILED DESCRIPTION OF THE INVENTION

1. Overview

Figure 1:
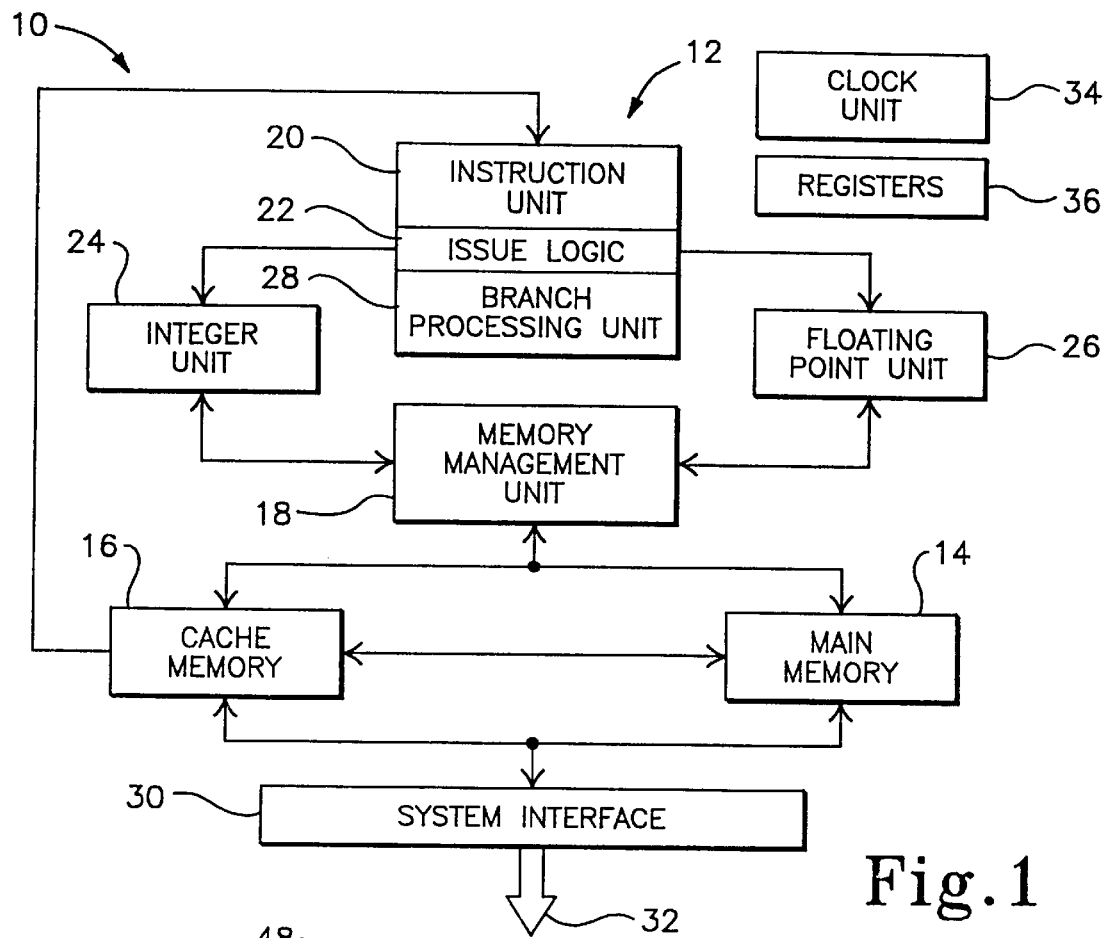
FIG. 1 is a simplified block diagram illustrating the general architecture of the Motorola PowerPC 601 RISC microprocessor.

FIG. 1 illustrates the general configuration of the PowerPC 601 RISC microprocessor. The figure is greatly simplified, and includes only those elements and level of detail that are necessary for understanding the concepts of the present invention.

The PowerPC 601 microprocessor constitutes a computer on which an application binary program is run in accordance with the invention. The PowerPC 601 microprocessor is generally designated by the reference numeral 10, and includes a superscalar processor 12. A compiled binary application program, in addition to the UNIX System V, Release 4, operating system for controlling execution of the program, are stored in a main memory 14.

Program instructions for execution are read out of the main memory 14 and stored temporarily in a cache memory 16 under control of a memory management unit 18. The processor 12 includes an instruction unit 20 that prefetches instructions from the cache memory 16 and stores them in an instruction queue (not shown). An issue logic unit 22 sequentially examines the instructions in the queue, and determines their type.

If the next instruction in the queue is an integer instruction, the issue logic 22 dispatches the instruction to an integer unit 24. Similarly, if the next instruction is a floating point instruction, the issue logic 22 dispatches it to a floating point unit 26. Branch instructions are dispatched from the issue logic 22 to a branch processing unit 28.

The integer unit 24, floating point unit 26 and branch processing unit 28 are capable of processing instructions simultaneously and independently in a pipelined manner. This makes it possible to implement features including look ahead operations and out of order instruction dispatches. Control of data and instruction flow between the processor 12, the main memory 14 and the cache memory 16 is performed by the memory management unit 18.

A system interface 30 connects the microprocessor 10 to external units (not shown) via a bus 32. Further illustrated are a clock unit 34 that generates clock and timing signals necessary for operation of the microprocessor 10, and a set of registers 36.

Although the registers 36 are illustrated as being a separate block, they are actually distributed among the various units in the microprocessor 10. The registers 36 include thirty-two 32 bit General Purpose Registers (GPR), thirty-two 64-bit Floating Point Registers (FPR), a Floating-Point Status and Control Register (FPSCR) and a number of additional user and supervisor level registers.

The microprocessor 10 further comprises a Count Register (CTR), a Condition Register (CR) and a Link Register (LR) that are located in the branch processing unit 18.

Figure 2:
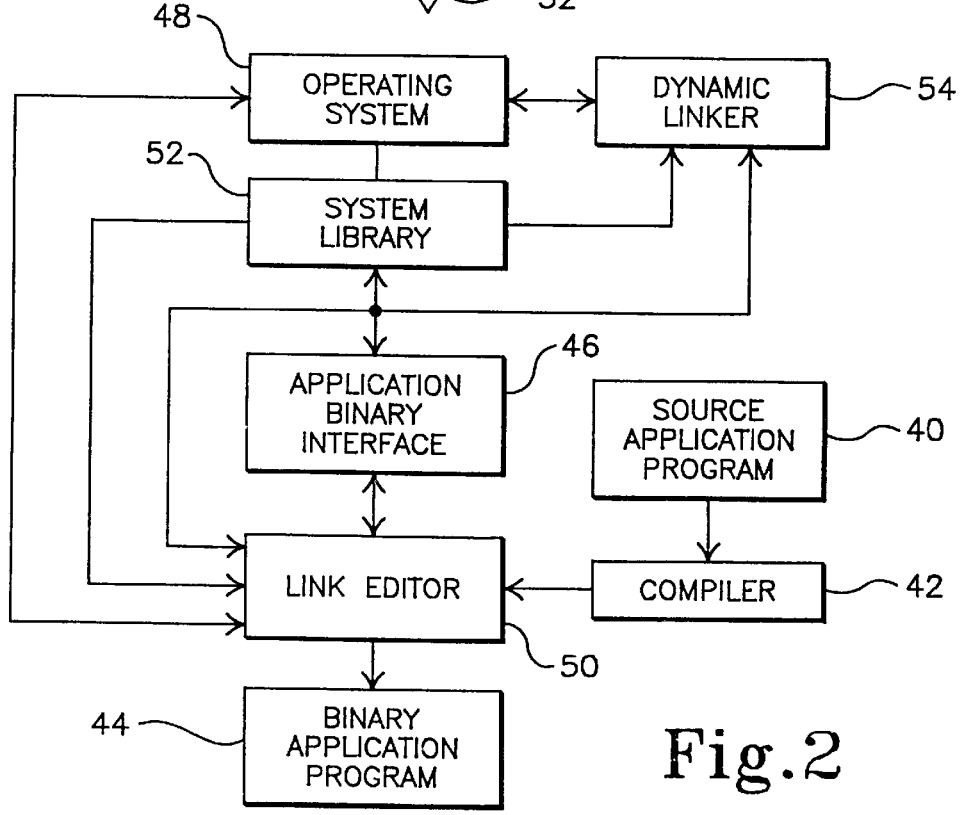
FIG. 2 is a simplified block diagram illustrating the main software elements required for running a user application program on the PowerPC microprocessor under the UNIX System V, Release 4, operating system.

FIG. 2 illustrates the main software units that are required to produce and run a binary application program on the microprocessor 10. An application program is initially written in a high level source language such as "C" to produce a source application program 40 in the form of text statements that can be edited using a word processor or the like. The source program 40 is processed by a compiler 42 and a linker 50 to produce a binary application program 44 in object code that can be executed by the microprocessor 10.

The link editor 50, also known as a static linker, combines the object modules produced by the program 44 with designated functions from a system library 52 to form a binary process image that is loaded.into the memory 14. As will be described in detail below, the process image comprises a number of binary object modules that interact with each other to implement the logical functions of the program. The link editor 50 performs various memory relocations using information available in the program 44 and the system library 52.

An Application Binary Interface (ABI) 46 embodying the present invention comprises a binary or machine language structure that is constructed in accordance with specified linkage conventions to interface the application program 44 to the microprocessor 10 and the UNIX System V, Release 4, operating system which is designated as 48, and to shared object libraries.

Further illustrated is a dynamic linker 54 which links application programs with shared object modules by performing relocations and appropriate linkages on the process image, and which is also available for use after control has been transferred to the process image which, at this point, constitutes a running program.

The PowerPC architecture defines an 8-bit byte, a 16-bit halfword, a 32-bit word, a 64-bit doubleword and a 128-bit quadword. Floating point variables can be represented as 32-bit single precision numbers (single word) or 64-bit double precision numbers (doubleword).

Figures 3, 4:
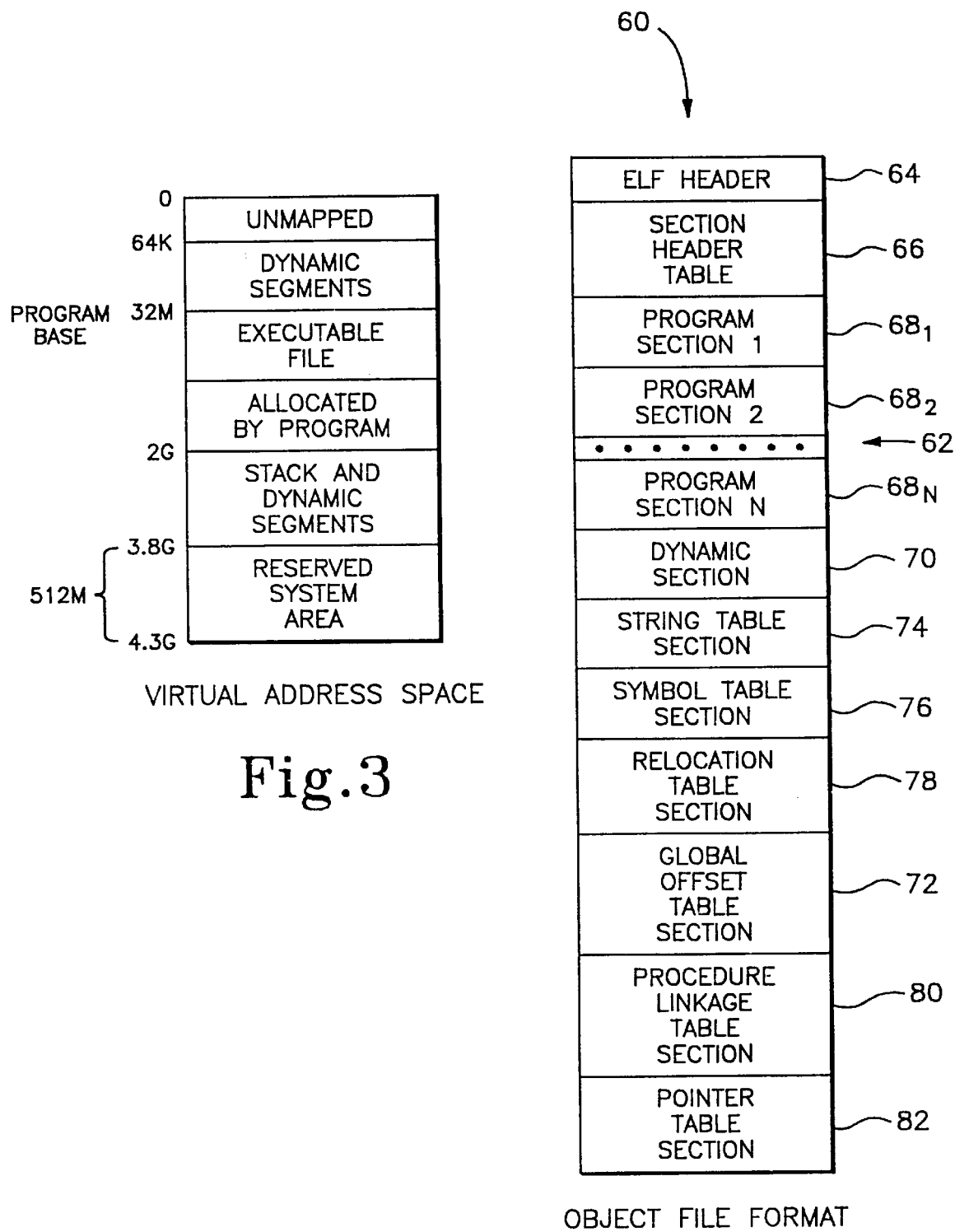
FIG. 3 is a simplified diagram illustrating the usage of virtual address memory space in the PowerPC microprocessor.
FIG. 4 is a diagram illustrating a binary object file format for a program to be run on the PowerPC, including an application binary interface according to the present invention.

FIG. 3 illustrates typical usage of virtual address space on the PowerPC microprocessor 10.

The memory management unit 18 translates virtual addresses into physical addresses, hiding physical addressing and letting processes run anywhere in the system's real main memory 14. Processes typically begin with three logical segments, commonly called text, data and stack. An object file may contain more segments, e.g. for debugger use, and a process can also create additional segments for itself with system services.

The microprocessor 10 has a 32 bit virtual address space, providing 4 gigabytes of effective addressable memory. Actual program space conventionally begins at 64 kilobytes, with a space between 64 kilobytes and 32 megabytes being used for dynamic segments that are required by the dynamic linker 54.

The program 44 comprises at least one executable file that conventionally begins at a program base of 32 megabytes. The virtual address space between 32 megabytes and 2 gigabytes is utilized by the program.

The space between 2 gigabytes and (4 gigabytes–512 megabytes) is used by the program stack and other dynamic segments. 512 megabytes at the top of the memory is reserved for use of the operating system 48.

FIG. 4 illustrates the present application binary interface 46 as being incorporated into a binary application object file program 60. The program 60 and associated shared objects are initially provided on a media such as a disk, CD ROM or the like (not shown), and are loaded into the virtual memory of the microprocessor 10 by the operating system 48 or the dynamic linker 54. The program 60 is preferably configured in Executable and Linking Format (ELF).

As discussed above, the program 60 includes a main executable object module, usually written in absolute (position-dependent) code, and one or more relocatable object modules usually written in relative (position-independent) code. A shared object file includes relocatable code and data suitable for linking in more than one task or context.

The object program 60 comprises an ELF header 64 that specifies the number and sizes of the sections of the program 60, in addition to other information required by the operating system 48. A section header table 66 is also provided, including information required to locate all of the sections of the file 60.

The actual text (program instructions) and data of the program are provided in a number of discrete sections, designated as $68_1$ to $68_N$. A dynamic section 70 contains dynamic linking information for use by the dynamic linker 54.

As discussed above, position-independent code cannot, in general, contain absolute virtual addresses. For this reason, a Global Offset Table (GOT) 72 is provided for each shared object module for storing absolute addresses in private data, thus making the addresses available without compromising the position-independence and shareability of a program's text. A program references a global offset table 72 using position-independent addressing and extracts absolute values, thus redirecting position-independent references to absolute locations.

In order for the link editor 50 and the dynamic linker 54 to perform the required relocations and resolve absolute addresses as required, the program further comprises a string table section 74 for storing text names of symbols including data constants, variables and strings, and a symbol table section 76 that references the string table 74. A relocation table 78 section provides a link between the instruction code in the sections $68_1$ to $68_N$, 72, 74 and 76, the link editor 50 and the dynamic linker 54.

The dynamic linker 54 fixes the cross-module references between the executable file and the shared object files in the program sections $68_1$ to $68_N$ of the object program 60 to create a process image 90 (position-dependent executable file and position-independent shared objects) as illustrated in FIG. 5. The dynamic linker 54 is also mapped into virtual memory, and is available for use by the application.

The process image 90 includes elements that are generated from the various sections of the program 60 and relocated as required. It will be noted that the process image for the executable position-dependent module need not include a global offset table, since the required absolute addresses are known by the link editor 50 when the program 60 is loaded into memory.

The process image 90 as illustrated in FIG. 5 includes an executable program object module 92 and a shared object module 94, although the number of shared object modules that can be included in the process image 90 is not limited within the scope of the invention.

The program object module 92 comprises a text segment 96 (the program instructions), a data segment 98 including variables that are referenced by the text segment 96, a procedure linkage table 100 and a pointer table 102. The shared object. module 94 similarly comprises a text segment 104, a data segment 106, a procedure linkage table 108 and a pointer table 110. The shared object module 94 further comprises a global offset table 112.

The process image 90 further comprises a relocation table 114, a symbol table 116 and a string table 118. The details of the present application. binary interface 46 will be further described for the shared object module 94. The structure and operation are essentially similar for the program object module 92, except that the module 92 does not include a global offset table.

The string table 118 is illustrated in FIG. 6, and comprises an entry for each global constant, variable, string or other data item that is designated using a symbol. Each entry in the string table 118 contains a text string containing the name of the associated symbol. The illustrated example includes three entries, ENTRY 1, ENTRY 2 AND ENTRY 3 which contain the text strings "SYMBOL_1", "SYMBOL_2" and "SYMBOL_3" respectively.

The symbol table 116 is illustrated in FIG. 7, and similarly comprises an entry for each symbol. Each entry includes an index or relative offset into the string table 118 for the respective symbol. More specifically, the index is the number of bytes from the beginning of the string table 118 to the first byte of the entry in the table 118 for the respective symbol.

In this manner, the-absolute address in the string table 118 in which the first character of the name of a symbol is stored can be obtained through the symbol table 116 by adding the respective index to the absolute address of the beginning of the string table 118.

Each entry in the symbol table 116 also includes a number corresponding to the value of the symbol. Depending on the context, this number can be the actual numerical value of the symbol, or an absolute or relative address at which the actual value of the symbol is stored. Each entry in the symbol table further comprises a number indicating the section in the program 60 with which the respective symbol is associated. The symbol can be designated as having one of a number of possible types in accordance with the designated section.

The relocation table 114 is illustrated in FIG. 8, and includes an entry for each item (e.g., instruction, data or PLT entry) that must be relocated. FIG. 8 illustrates two exemplary data entries and two function entries.

2. Acquisition of Global Offset Table (GOT) Pointer

The global offset table 112 is illustrated in FIG. 9. The format and interpretation of the global offset table 112 are processor-specific. For the PowerPC microprocessor 10, the symbol _GLOBAL_OFFSET_TABLE_ may be used to access the table 112. The value of this symbol is the absolute base address of the table 112 in virtual memory. The symbol may reside in the middle of the table 112 as illustrated, allowing both positive and negative indexes or "subscripts" into the array of addresses. In the illustrated example, two entries are provided below the symbol _GLOBAL_OFFSET_TABLE_, with two entries being provided above the symbol.

As discussed above, each absolute address is represented by 32 bits, which constitute one word or four 8-bit bytes.

The word starting at four addressable memory locations preceding the symbol \_GLOBAL\_OFFSET\_TABLE\_ (the absolute virtual address [\_GLOBAL\_OFFSET\_TABLE\_4]), contains the RISC instruction "bclrl" as will be described in detail below. The next three words following \_GLOBAL\_OFFSET\_TABLE\_ are reserved.

One of these words is set by the link editor 50 to contain the address of the dynamic structure, referenced with the symbol \_DYNAMIC. This allows a program, such as the dynamic linker 54, to find its own dynamic structure without having yet processed its relocation entries. This is especially important for the dynamic linker 54, because it must initialize itself without relying on other programs to relocate its memory image.

Initially, the global offset table 112 holds information as required by its relocation entries as determined by the link editor 50. When the dynamic linker 54 creates memory segments for a relocatable object file, it processes the relocation entries with reference to the global offset table 112. The dynamic linker 54, determines or resolves the associated symbol values, calculates their absolute addresses, and sets the global offset table entries to the proper values.

The dynamic linker 54 uses the relocation table 114 and symbol table 116 to adjust instructions, data and PLT entries to account for the absolute memory addresses at which they reside at run time.

Although the absolute addresses are unknown when the link editor 50 builds an object file, the dynamic linker 54 knows the addresses of all memory segments and can thus calculate the absolute addresses of the symbols contained therein.

A global offset table entry provides direct access to the absolute address of a symbol without compromising position-independence and shareability. Because the executable file and shared objects have separate global offset tables, a symbol may appear in several tables. The dynamic linker 54 processes all the global offset table relocations before giving control to any code in the process image, thus ensuring the absolute addresses are available during execution.

The dynamic linker 54 may choose different memory segment addresses for the same shared object in different programs. It may even choose different library addresses for different executions of the same program. Nonetheless, memory segments do not change addresses once the process image 90 is established. As long as a process exists, its memory segments reside at fixed virtual addresses.

FIGS. 11a to 11d illustrate an aspect of the present application binary interface 46 that enables a calling module (usually a shared object module) to obtain the absolute virtual address of the base of the global offset table 112 (GOT pointer) of the shared object module 94.

This address is the value of the symbol \_GLOBAL\_OFFSET\_TABLE\_ as described above. Once the base address has been obtained and loaded into a user register, the absolute addresses of the symbols in the global offset table 112 can be resolved for memory access by adding the base address to the index or relative offset of the required symbol into the GOT 112 as described above.

Figure 11A:
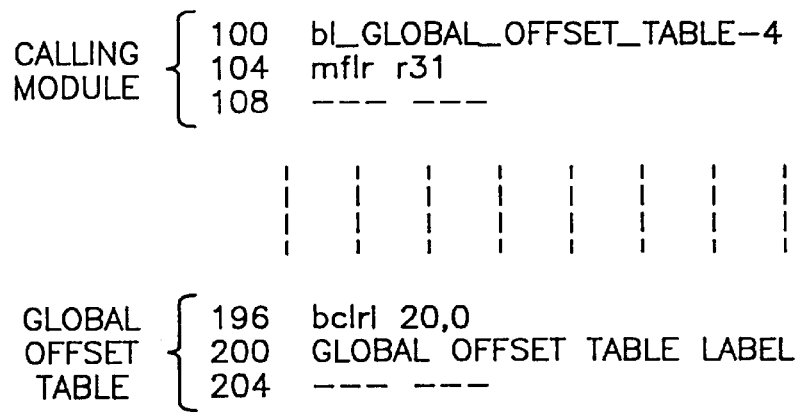
FIGS. 11a to 11e are diagrams illustrating binary code instructions and register usage for loading an absolute base address of the global offset table of FIG. 9 into a register.

In FIG. 11a, arbitrary absolute addresses have been assigned to the instruction code and the global offset table in a module. The code in the module begins at address 100, whereas the base address for the symbol \_GLOBAL\_OFFSET\_TABLE\_ in the GOT is 200.

A PowerPC RISC instruction "bclrl 20,0" (branch conditional to link register and link) instruction is stored at the address \_GLOBAL\_OFFSET\_TABLE\_-4=196. The remainder of the GOT 112 begins at the address 204. An instruction "bl \_GLOBAL\_OFFSET\_TABLE\_-4" (branch and link to the address [\_GLOBAL\_OFFSET\_TABLE\_-4]) instruction is stored at the address 100 (the instruction is a relative branch).

Figure 11B:

FIG. 11b illustrates a program counter (PC) of the microprocessor 10 as initially pointing to the address 100. The instruction (INS) at the address 100 is the branch and link instruction "bl". The link register (LR), prior to execution of the instruction at 100, contains a value that is not relevant to the invention. Further illustrated is a user register, for example the register R31, that is conventionally used to store local variables. The initial contents of the register R31 are similarly, as illustrated in FIG. 11b, not relevant.

Figure 11C:

FIG. 11c illustrates the status of the microprocessor 10 after execution of the "bl" instruction. The program counter PC points to the address 196, which contains the "bclrl" instruction. The link register LR contains the address of the instruction following the "bl" instruction, in this case the address 104. The register R31 is not as yet used.

Figure 11D:

FIG. 11d illustrates the results of executing the "bclrl" instruction which is stored at address 196. The fields 20,0 are included to disable the conditional branching capability of the "bclrl" instruction, such that the program branches unconditionally to the address stored in the link register LR. Since this address is 104, the program branches to an "mflr R31" (move from link register) instruction at the address 104.

In accordance with the present invention, after execution of the "bclrl" instruction as illustrated in FIG. 11d, the address of the instruction following the "bclrl" instruction is loaded into the link register LR. This address is 200, or the desired base address of the global offset table 112.

Figure 11E:

As illustrated in FIG. 11e, the "mflr" instruction that is stored at address 104 is executed, causing the contents of the link register LR (the base address of the global offset table 112) to be copied into the user register R31. The register R31 thereby contains the base address for accessing the global offset table 112 as desired.

It will be noted that the instruction at the address 108 does not have to cause the contents of the link register LR to be moved to the user register R31. The instruction at this address can perform some other operation, as long as it does not overwrite the link register LR. The operation of copying the link register LR to a user register can be performed at a later time using an instruction at an address following 108.

The operation as illustrated in FIGS. 11a to 11e in accordance with the present invention occupies less space and takes less time than the mechanism used in the prior art, which required adding a 32-bit offset to an address obtained from a call instruction. Implementation of the method requires only three simple instructions, one in the global offset table 112 and only two in the calling function.

3. Calls to Functions in Shared Object Modules

The program 60 further comprises a procedure linkage table (PLT) section 80, including a procedure linkage table for each object module for redirecting position-independent function calls to absolute locations. It will be noted that the link editor 50 cannot resolve execution transfers (such as function calls) from one executable or shared object module to another.

Consequently, the link editor 50 arranges to have the program transfer control to entries in the procedure linkage tables. Although not explicitly illustrated, position-dependent executable files and position-independent shared object files have separate procedure linkage tables. In accordance with the implementation of the present application binary interface 46, a pointer table section 82 includes a pointer table for each respective procedure linkage table 80.

The procedure linkage table 108 redirects position-independent function calls to absolute locations. The link editor 50 cannot resolve execution transfers (such as function calls) from one executable or shared object to another. Consequently, the link editor 50 arranges to have the program transfer control to entries in the procedure linkage table 108.

References to the address of a function from the executable object file 92 and the shared objects 94 associated with it need to resolve to the same value. References from within shared objects will normally be resolved by the dynamic linker 54 to the virtual address of the function itself. References from within the executable file 92 to a function defined in a shared object 94 will normally be resolved by the link editor 50 to the address of the procedure linkage table entry for that function within the executable file 92. To allow comparisons of function addresses to work as expected, if the executable file 92 references a function defined in the shared object 94, the link editor 50 will place the address of the procedure linkage table entry for that function in its associated symbol table entry.

The procedure linkage table 108 and pointer table 110 for the shared object module 94 are illustrated in FIG. 10. The procedure linkage table 108 comprises a dynamic linker call section 120 including dynamic call instruction code for calling the dynamic linker 54, and a far call section 122 including generic branch instruction code for branching to a supplied absolute virtual address.

The procedure linkage table 108 further includes an entry for each function that is accessed through the table 108. The functions include close functions that can be reached by relative branching from the respective entry in the procedure linkage table 108 (±32 megabytes from the entry), and far functions that are too far away to be reached by relative branching. The illustrated example includes two close functions and two far functions.

The pointer-table 110 includes an entry for each function entry in the procedure linkage table 108. The entries for the close functions are not used. The entry for each far function contains the absolute virtual address of the function. As will be described in detail below, the entry for each close function contains a relative branch instruction to the respective function. The entry for each far function contains an instruction that provides an index into the pointer table, and a call to the far call section to branch to the absolute address of the respective function.

In accordance with the present application binary interface 46, the dynamic linker 54 constructs the procedure linkage table 108 and pointer table 110 for an object module in a process memory image in which space is allocated for the procedure linkage table 108, but the PLT 108 does not appear in the object module.

The pointer table 110 stores absolute addresses of external functions that cannot be reached by relative branching from the module. The procedure linkage table 108 receives calls to these functions, gets the absolute addresses from the pointer table 110 and branches to the absolute addresses of the functions. The procedure linkage table 108 also receives calls to functions that can be reached by relative branching from the module, and branches relative to these functions.

The dynamic linker 54 first creates a dummy or shell procedure linkage table 108 including the dynamic linker call section 120, the far call section 122 and an entry for each external function called by the module that initially branches to the dynamic linker call section 120.

When a function that cannot be reached by relative branching is first called through the respective entry, the entry branches to the dynamic linker call section 120, which calls the dynamic linker 54 to resolve and store the absolute address of the called function in the pointer table 110 and alter the entry to subsequently branch to the absolute address through the far call section 122.

When a function that can be reached by relative branching is first called through the respective entry, the entry branches to the dynamic linker call section 120, which calls the dynamic linker 54 to alter the entry to subsequently branch relative to the function.

More specifically, procedure linkage tables are not physically provided in the executable or shared object files of the original object file program 60. Instead, the link editor 50 reserves space for them in the process image 90, and the dynamic linker 54 initializes them and manages them according to its own, possibly implementation-dependent needs.

The dynamic linker 54 initially creates a dummy or shell procedure linkage table for each object module having the following configuration.

LISTING 1

```
.PLTresolve:
            addis   r12,r0,dynamic_linker@ha
            addi    r12,r12,dynamic_linker@lo
            mtctr   r12
            addis   r12,r0,symtab_addr@ha
            addi    r12,r12,symtab_addr@lo
            bctr
.PLTcall:
            addis   r11,r11,,.PLTtable@ha
            lwz     r11,.PLTtable@lo(r11)
            mtctr   r11
            bctr
.PLT1:      addi    r11,r0,4*1
            b       PLTresolve
.PLT2:
            addi    r11,r0,4*2
            b       PLTresolve
.PLT3:
            addi    r11,r0,4*3
            b       PLTresolve
.PLT4:
            addi    r11,r0,4*3
            b       PLTresolve
.PLTtable:
            nop
            nop
            nop
            nop
```

LISTING 1

In the above listing, the code between .PLTresolve: and .PLTcall: is the dynamic link caller call section 120 illustrated in FIG. 10. The code between .PLTcall: and .PLT1: is the far call section 122. The sections .PTL1: and .PTL2: are the entries for the two close call function entries ENTRY 1 and ENTRY 2, whereas .PTL3: and .PTL4: are the entries for the two far call function entries ENTRY 3 and ENTRY 4 respectively. The section .PLTtable: is the pointer table 110.

In its initial form, the procedure linkage table 108 and pointer table 110 contain dummy entries. Although it is within the scope of the invention to initialize all of the entries in the procedure linkage table 108 prior to transferring control to the process image 90, it is desirable to initialize each function as it is called during the natural running of the program. This operation is called "lazy binding", and generally improves the overall application performance because unused symbols do not incur the dynamic linking overhead.

The entries in the procedure linkage table 108 are initialized, or altered from their shell state. in the following manner as illustrated in the following program listing. The dynamic linker call section 120 (.PLTresolve:), which contains the dynamic call instruction code for calling the dynamic linker 54, and the far call section 122 (.PLTcall:) which includes the generic branch instruction code for branching to a supplied absolute virtual address, are not altered.

LISTING 2

```
.PLT1:
        b       f1_rel_addr
        b       PLTresolve
.PLT2:
        b       f2_rel_addr
        b       PLTresolve
.PLT3:
        addi    r11,r0,4*3
        b       PLTcall
.PTL4:
        addi    r11,r0,4*4
        b       PTLcall
.PLTtable:
        nop
        nop
        f3_abs_addr
        f4_abs_addr
```

LISTING 2

As discussed above, each word includes four 8-bit bytes for a total of 32 bits, and occupies four addressable locations in virtual memory. The dynamic linker 54 is able to reference the entries in the procedure linkage table 108 using any arbitrary one-to-one function of the entry numbers. In accordance with the present invention, since each address in the pointer table 110 consists of one word, the dynamic linker 54 is configured to access each entry as (4*N), where N is the entry number.

In this manner, the dynamic linker 54 references ENTRY 1 as (4*1)=4, ENTRY 2 as (4*2)=8, etc. Using this convention, the number by which each entry is referenced by the dynamic linker 54 is also the index or offset of the respective pointer table entry from the beginning of the pointer table 110. The desirability of this arrangement will become apparent from further description.

It will be assumed that the first function that is called to initialize the corresponding entry in the procedure linkage table 108 is a close function, which lies within ±32 megabytes of its entry in the procedure linkage table 108 and can be reached by relative branching. However, the invention is not so limited, and the close and far functions can be called and interspersed with each other in any order.

In the above listings, the notation "X@lo" (read "the low part of X") denotes the low order 16 bits of the value of X.

The notation "X@ha" (read "the high adjusted part of X") denotes the high order 16 bits of the value of X, adjusted upward by 1 if the high order bit of X@lo is a 1. This compensates for the fact that immediate addition and address calculation for memory reference instructions treat X@lo as a signed quantity.

The first function corresponding to ENTRY 1 (.PLT1:) in the procedure linkage table 108 is referenced by the dynamic linker 54 as (4*1). More specifically, the link editor 50 resolves the address of the call to the function to the "addi r11,r0,4*1" (add immediate) instruction in the entry .PLT1:, which causes the number 4*1=4 to be loaded into user register r11.

The next instruction, "b PLTresolve", causes the program to branch to the first instruction in the dynamic linker call section 120 (.PTLresolve:), which is "addis r12,r0, dynamic_linker@ha" (add immediate shifted). This causes the high adjusted 16 bits of the absolute virtual address [dynamic_linker@ha] of the dynamic linker 54 to be loaded into the register r12 and shifted left by 16 bits, with the low 16 bits of the register r12 being set to zero.

The next instruction, "addi r12,r12,dynamic_linker@lo" (add immediate), causes the low 16 bits of the absolute virtual address [dynamic_linker@lo] of the dynamic linker 54 to be added to the register r12. In this manner, the register r12 contains the entire 32 bit absolute virtual address of the dynamic linker 54.

The contents of the register r12 are copied into the counter register CTR by the next instruction, "mtctr" (move to counter register.

The next instruction, "addis r12,r0,symtab@ha" (add immediate shifted), causes the high adjusted 16 bits of the absolute virtual address [symtab@ha] of the symbol table 116 to be loaded into the register r12 and shifted left by 16 bits, with the low 16 bits of the register r12 being set to zero.

The next instruction, "addi r12,r12,symtab@lo" (add immediate), causes the low 16 bits of the absolute virtual address [symtab@lo] of the symbol table 116 to be added to the register r12. In this manner, the register r12 contains the entire 32 bit absolute virtual address of the base of the symbol table 116.

The dynamic linker 54 is called using the next instruction, "bctr", which causes program execution to branch to the address stored in the counter register CTR. As described above, the counter register CTR contains the address of the dynamic linker 54. The call to the dynamic linker 54 is made with reference to the base address-of the symbol table 116, and the entry number expressed as (4*1) in the register r11.

The dynamic linker 54 accesses the relocation table entry for ENTRY 1, which references the symbol ENTRY_1. The dynamic linker 54 then initializes the entry .PLT1: by destructively overwriting the initial addi r11,r0,4*1 instruction with the instruction "b f1_rel_addr" (branch), where f1_rel_addr is the relative offset to the function corresponding to ENTRY_1.

Upon subsequent calls to the entry for the first function (ENTRY_1), the dynamic linker 54 will not be called. Instead, execution will branch directly to the function through the "b f1_rel_addr" instruction.

It will be noted that the entry in the pointer table 110 for ENTRY_1 is not relevant and includes a "nop" (no operation) instruction. The operation is essentially similar for the second close function (ENTRY_2).

The third and fourth functions corresponding to ENTRY_3 and ENTRY_4 are far functions that lie more than ±32 megabytes from their entries in the procedure linkage table 108, and cannot be reached by relative branching.

The third function corresponding to ENTRY_3 (.PLT3:) in the procedure linkage table 108 is referenced by the dynamic linker 54 as (4*3). More specifically, the dynamic linker 54 resolves the address of the call to the function to the "addi r11,r0,4*3" add immediate) instruction in the entry .PLT3:, which causes the number 4*3=12 to be loaded into the register r11.

The "b PLTresolve" instruction causes execution to branch to the dynamic linker call section 120 (.PLTresolve:), which references the symbol table 116 with four times the entry number as described above. Rather than altering the first instruction "li r11,4*3" as for a close function, the dynamic linker 54 destructively overwrites the second instruction "b PLTresolve" in the entry .PLT3: to read "b PLTcall", after storing the absolute virtual address of the function in the third entry of the pointer table 110.

Upon a subsequent call to the third function, the call is resolved to the entry .PLT3:. The first instruction loads four times the entry number into the register r11 as described above. The second instruction, "b PLTcall", branches to the far call section 122 (.PLTcall:).

The first instruction, "addis r11,r11,.PLTtable@ha" (add immediate shifted), adds the high adjusted 16 bits of the absolute address of the pointer table to the contents of the register r11. The next instruction, "lwz r11,.PLTtable@lo (r11)" (load word and zero), causes the third pointer table entry, which contains the absolute address of the function ENTRY_3, to be loaded into the register r11.

The next instruction, "mtctr r11" (move to counter register), causes the address in the register r11 to be copied into the counter register CTR. The instruction "bctr" (branch to counter register) causes program execution to branch to the address in the counter register CTR, which is the absolute virtual address of the called function. The operation is essentially similar for the fourth function corresponding to ENTRY 4 (.PLT4:).

In the far call section 122, the symbols PLTtable@ha and PLTtable@lo correspond to the high adjusted and low 16 bits of the base address of the pointer table 110 respectively. Adding this address to the index or offset into the pointer table 110 constituted by four times the entry number as stored in the register r11 produces the absolute address in the pointer table 110 that contains the absolute address of the function.

The program code required to implement the procedure linkage table 108 and pointer table 110 in accordance with the present application binary interface 46 is substantially smaller than in prior art applications. Only one instruction is altered for resolving the function address for each entry, regardless of whether the function can or cannot be reached by relative branching. This enables each entry to be constructed atomically, and eliminates all problems associated with re-entrancy.

4. Variable Argument List Function Calls

As discussed above, if a floating point argument is passed to a variable argument list or "varargs function" such as "printf", the contents of the registers containing the floating point arguments must be saved in the memory 14 for future use, since some or all of these registers will be overwritten during execution of the function.

Although this procedure is straightforward for functions that actually process floating point arguments, there are many instances in which varargs functions pass only integer, string or other types of arguments that do not affect the floating point registers. In spite of this, conventional procedure requires storing the floating point argument registers each time a varargs function is called, regardless of whether or not a floating argument was actually passed.

Performing this process when it is not necessary results in a substantial reduction in the processing speed and inefficient operation of the microprocessor 10.

This drawback of the prior art is overcome by another aspect of the present application binary interface 46, in which a status setting instruction precedes each call instruction to a function that might be a varargs function, indicating whether floating point arguments are actually being passed.

Figure 12:
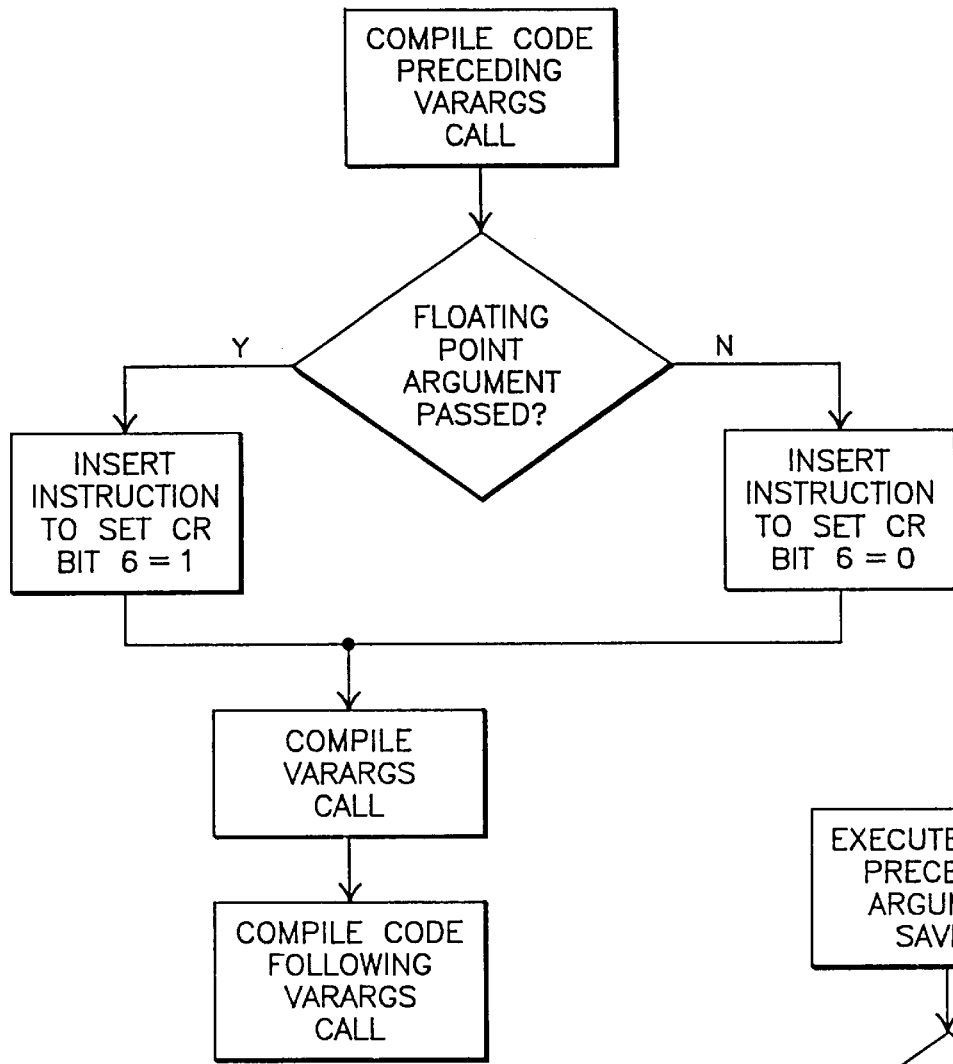
FIGS. 12 and 13 are flowcharts illustrating how variable argument list functions are handled by the present application binary interface.

More specifically, as illustrated in the flowchart of FIG. 12, the compiler 42, upon completion of compiling the code preceding a varargs function call, knows whether or not the call is passing floating point arguments to the function. Utilizing this information, the compiler 42 inserts a "status setting" instruction before the call to the varargs function. The compiler 42 then compiles the call to the function and following code.

The status instruction has either a first value, "creqv 6, 6, 6" (condition register equivalent) if the call passes at least one floating point argument to the varargs function, or a second value, "crxor 6,6,6" (condition register XOR) if it does not.

The first status instruction value "creqv 6,6,6" sets bit 6 of the condition register CR to "1". More specifically, this instruction computes the exclusive-OR of bit 6 with bit 6, and sets bit 6 of the condition register CR to the complement of the result. Since taking the exclusive-OR of any number with itself will produce a result of "0", the complement of the result will always be "1".

The second status instruction value "crxor 6,6,6" sets bit 6 of the condition register CR to "0". More specifically, this instruction computes the exclusive-OR of bit 6 with bit 6, and sets bit 6 of the condition register CR to the result. Since taking the exclusive-OR of any number with itself will produce a result of "0", this instruction will always produce a result of "0".

The compiler 42 also inserts one additional instruction at the beginning of each varargs function, more specifically "bc 13,6,beyond" (branch conditional). Each varargs function has an initialization section that contains instructions for storing the floating point argument registers. Execution of the function itself begins at an address subsequent to the initialization section that is referenced by the symbol "beyond".

Figure 13:
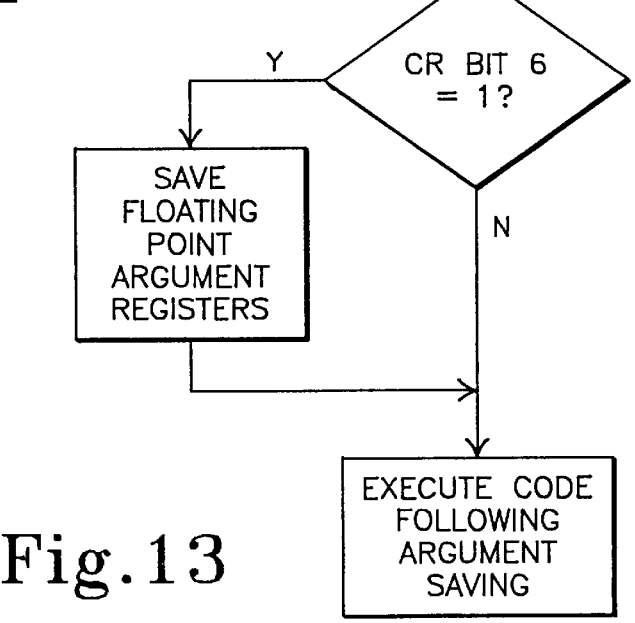

When a varargs function is called in accordance with the present invention, as illustrated in the flowchart of FIG. 13, the "bc" instruction tests bit 6 of the condition register CR to determine whether it has been set to "1" or "0". It bit 6 is "1", indicating that one or more floating point arguments are being passed to the function, execution proceeds through the "bc" instruction to the function's initialization section which causes the floating point state of the microprocessor 10 to be stored in the memory 14.

If, however, bit 6 is "0", indicating that a floating point argument is not being passed to the function, the "bc" instruction causes execution to branch around or bypass the initialization section to the address "beyond", such that the function is executed without saving the floating point argument registers.

It will be understood that the present invention is not limited to the particular arrangement described above. For example, the application binary interface 46 can use any suitable means to indicate to a called function whether or not a floating point argument is passed.

The ANSI C programming language requires that variable argument list functions be declared with a prototype containing a trailing ellipsis, but compiler vendors are expected to provide options for non-ANSI programs to allow them to declare variable argument list functions in the command line or to treat all non-prototyped functions as (potentially) having variable argument lists.

Where such an indication is not available, it is further within the scope of the invention to provide the status instruction ahead of any function calls in the program, that can possibly be variable argument functions.

This aspect of the present invention eliminates the unnecessary operations of saving the floating point argument registers in a call to a variable argument list function that does not actually pass floating point arguments to the functions. The unnecessary operations are eliminated both when the functions are called, and upon context switching (switching from one task to another).

Since a program or task that does not pass floating point arguments and does not otherwise use floating point instructions will not acquire a floating point state, the operating time required to save the entire floating point state upon context switching from the task to another task is saved. This is in contrast to the prior art in which a program will acquire a floating point state merely because it calls a varargs function, even if floating point arguments are not actually passed.

5. Removing Address Mappings for Terminated Processes

Figure 14:
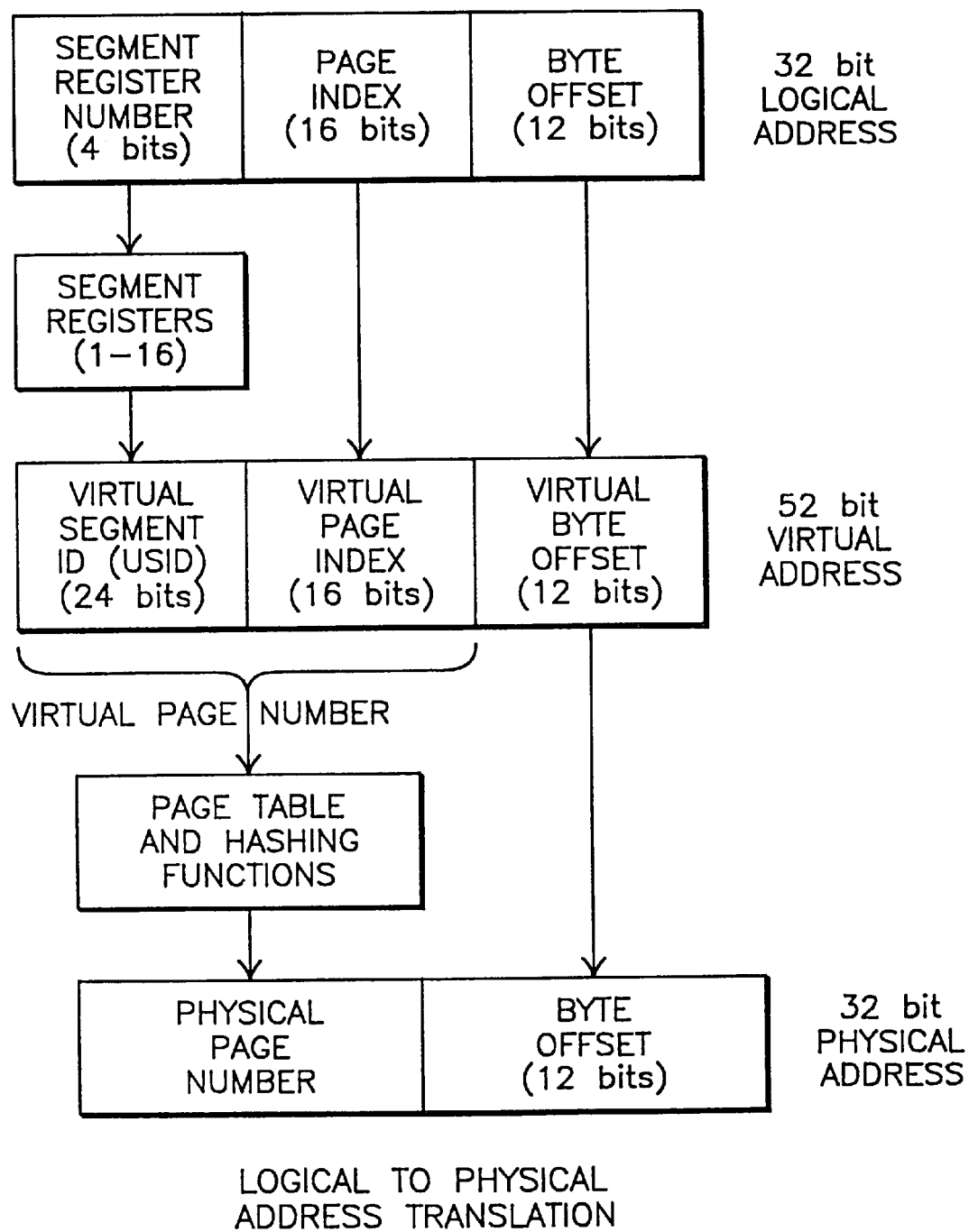
FIG. 14 is a diagram illustrating logical to physical address translation as performed by the PowerPC.

Aa illustrated in FIG. 14, a logical or effective address in the 32-bit PowerPC implementation is 32 bits long. The high order 4 bits of the 32-bit effective address select a segment register, which contains a 24-bit Virtual Segment Identifier (VSID). Loading of segment registers (not shown) is a privileged operation.

The low order 28 bits of the effective address constitute the offset, giving a 52-bit virtual address. The high order 16 bits of the 28 bit offset are called the virtual page index, which selects the page within the virtual segment. Translating a virtual address involves locating the Page Table Entry (PTE) for the virtual address. The physical base and length of the page table are specified in the PowerPC's Table Search Description (SDR1) register.

The page table base must be at a physical address which is a multiple of its length, which is constrained to be a power of 2 and contains at least 8,192 entries. Since PTES are 8 bytes long, the minimum page table size is 65,536 bytes. The page table is divided into Page Table Entry Groups (PTEGs), each consisting of eight PTEs.

To locate the PTE for a given virtual address, the 19 least significant bits of the VSID are combined with the virtual page index via a "primary" hashing function (exclusive-OR). The result, modulo the number of PTEGs in the page table, is the index within the page table of the primary group that is expected to contain the PTE for the virtual address.

The group is searched and, if the PTE for the virtual address being translated is not found (a PTE contains enough information about the virtual address to determine whether there is a match) a secondary hash is computed (the ones complement of the primary hash), and the secondary PTEG is searched for a virtual address match. If either the primary or secondary match succeeds, the 20 bit Physical Page Number (PPN) field in the PTE specifies the physical address corresponding to the virtual address.

The algorithm for computing the secondary group from the primary group (taking the ones complement of the group number) leads the PTEGs to be naturally paired. That is, if B is the secondary group corresponding to primary group A, then A is the secondary group corresponding to primary group B. A PTEG pair is constituted by the 16 PTEs that are in the respective primary and secondary PTEGs.

The hashing functions are synthesized by the operating system 48 to allocate the PTEs more evenly in the page table and maximize the hit rate of the table search operation.

Figure 15:
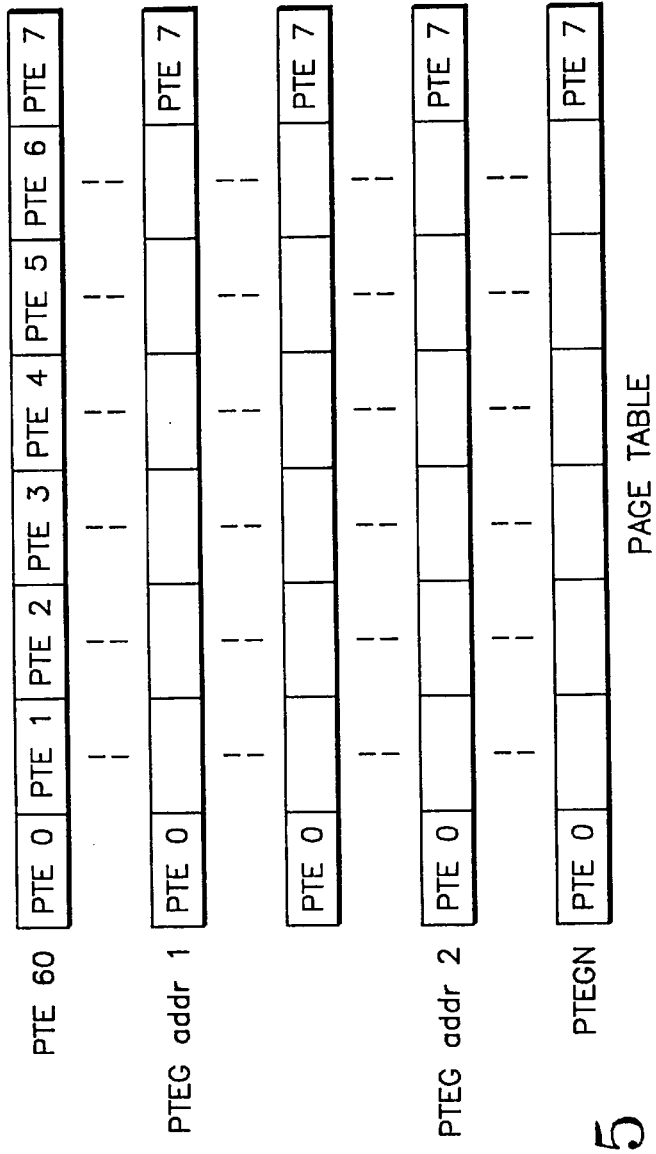
FIG. 15 is a diagram illustrating a page table structure of the PowerPC.

The general configuration of a PowerPC page table is illustrated in FIG. 15. Each primary and second PTEG comprises eight PTEs that are designated as PTE0 to PTE7. The primary PTEG for a given VSID is designated as PTEGaddr1, whereas the secondary PTEG is designated as PTEGaddr2.

Figure 16:
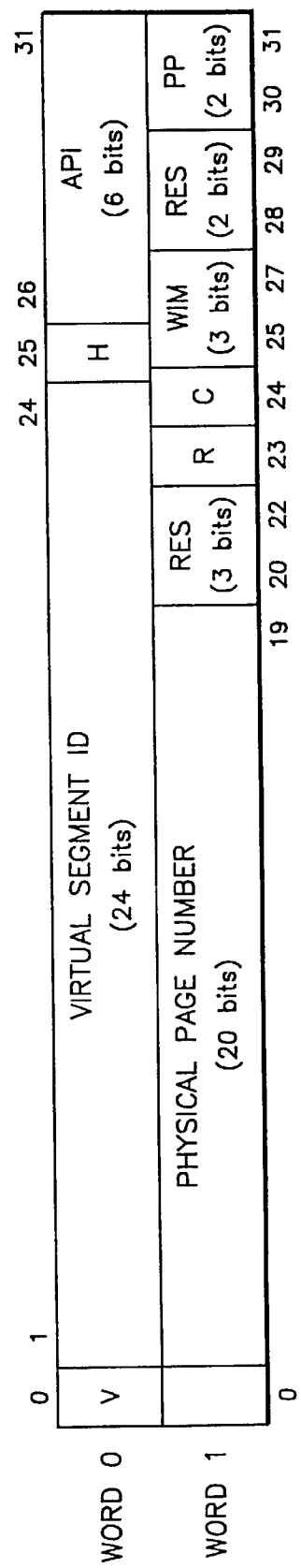
FIG. 16 is a diagram illustrating the configuration of an entry in the page table of FIG. 16.

The configuration of each PTE is illustrated in FIG. 16. Each PTE consists of two 32 bit words, such that each PTE entry is 64 bits or 8 bytes long. The first bit of the first word, WORD0, is a Valid bit "V". This indicates whether the PTE is valid (mapping a selected VSID to a corresponding physical page in memory), or is invalid (not used or free).

The V bits in the PTEs are initialized to "0". When the operating system 48 performs a virtual to physical address mapping through a PTE, it sets its V bit to "1". When the mapping is no longer required, such as when a process using the mapping has terminated, the operating system 48 sets the V bit to "0".

Bits 1 to 24 of WORD0 of the PTE contain the VSID. Bit 25 is a Hash Function Identifier "H", which designates whether the mapping was performed using the primary or secondary hashing function. Bits 26 to 31 contain the Abbreviated Page Index (API), consisting of the most significant 6 bits of the page index of the effective address.

Bits 0 to 19 of WORD1 of the PTE contains the Physical Page Number (PPN) of the 32 bit physical address. Bits 20 to 22 are reserved for use by the operating system 48. Bit 23 is a Reference bit "R" that is set to "1" whenever the PTE is referenced. Bit 24 is a Change bit "C" which is set to "1" when the page is stored into or otherwise changed. Bits 28 and 29 are reserved for use by the operating system 48. Bits 30 and 31 contain Page Protection bits "PP" that allows the operating system 48 to provide selective access to the page.

Figure 17:
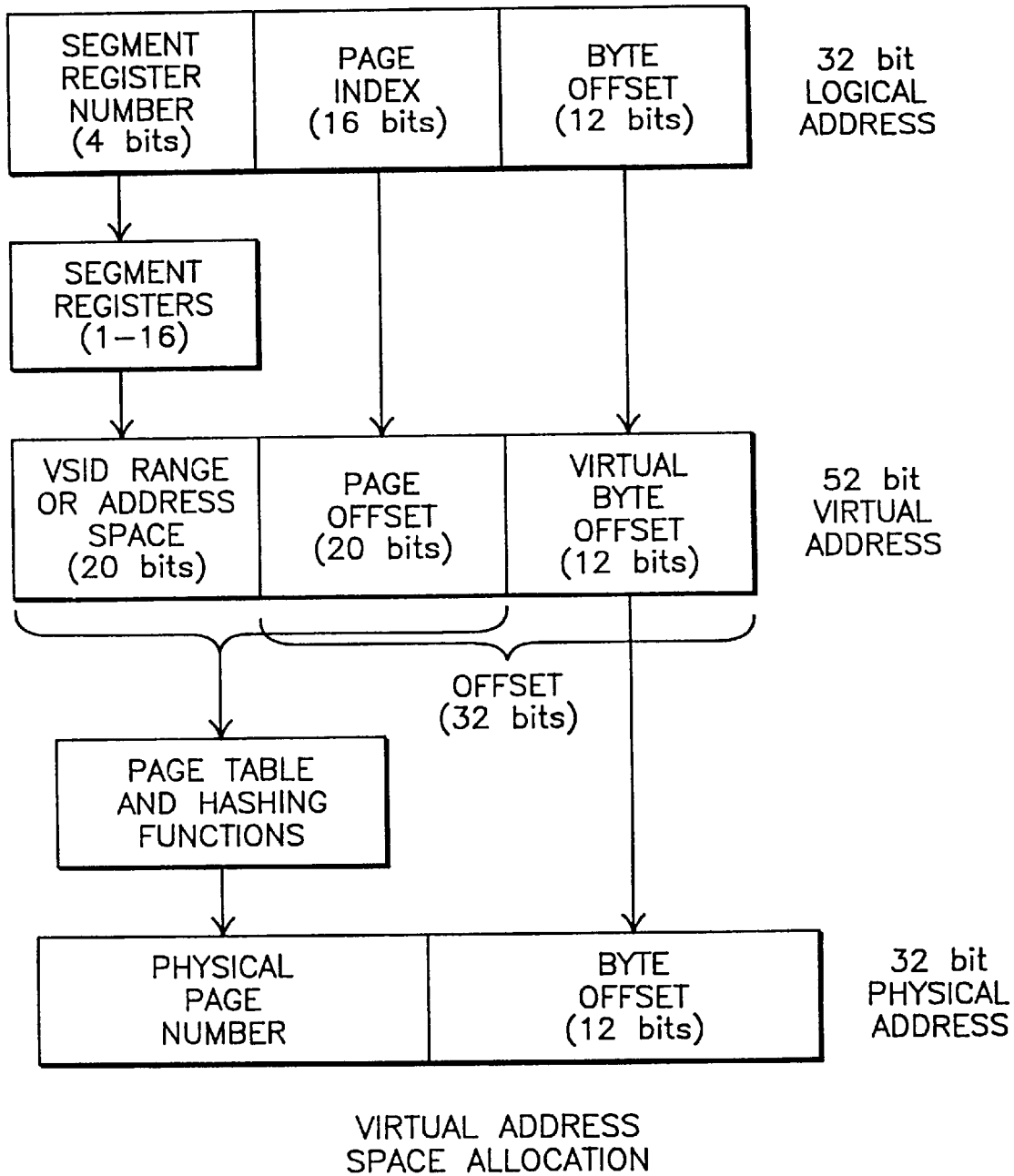
FIG. 17 is similar to FIG. 14, but illustrates modification of translation configuration to provide 32 bit address spaces for process execution.

FIG. 17 illustrates how the address translation convention is used by the present application binary interface 46. As illustrated in FIG. 14, the PowerPC divides the most significant 40 bits of the 52-bit virtual address into a 24-bit VSID and a 16-bit virtual page index. The present invention divides these 40 bits into a 20-bit VSID range or address space and a 20 bit offset into the VSID range.

The 20-bit VSID range provides $2^{20}$=1,048,576 VSID ranges, each consisting of 16 VSIDs. The 20-bit offset similarly provides 1,048,576 divisions of each VSID range.

In accordance with the present invention, each process that is to be run on the PowerPC is assigned a VSID range, thereby providing a 32-bit (4,294,967,296 byte) address space (20-bit VSID offset plus 12-bit byte offset) for running the process. One VSID range is used for each process fork, exec, and swap-in.

In this manner, the address space that is assigned to each process has the same size as the logical address space that is addressed by the program, providing a one-to-one correspondence between logical addressing by the program and physical addressing by the memory management unit 18. It will be understood, however, that although the virtual address space is utilized by the present application binary interface 46 as illustrated in FIG. 17, it is interpreted by the memory management unit 18 of the PowerPC microprocessor 10 in the manner illustrated in FIG. 14.

As discussed above, due to the manner in which virtual to physical address translation is performed on the PowerPC, unmapping of the PTEs for each process conventionally requires that the entire page table be searched for entries having corresponding VSIDs.

Even with the extremely high processing speed of the PowerPC, unmapping of the PTEs on a system of moderate size for a single process might require approximately ⅓ second. The PTE unmapping operation, if performed in the conventional manner (unmapping the PTEs for each process as soon as the process has terminated), constitutes unacceptable overhead in the operation of the system.

Figure 18:
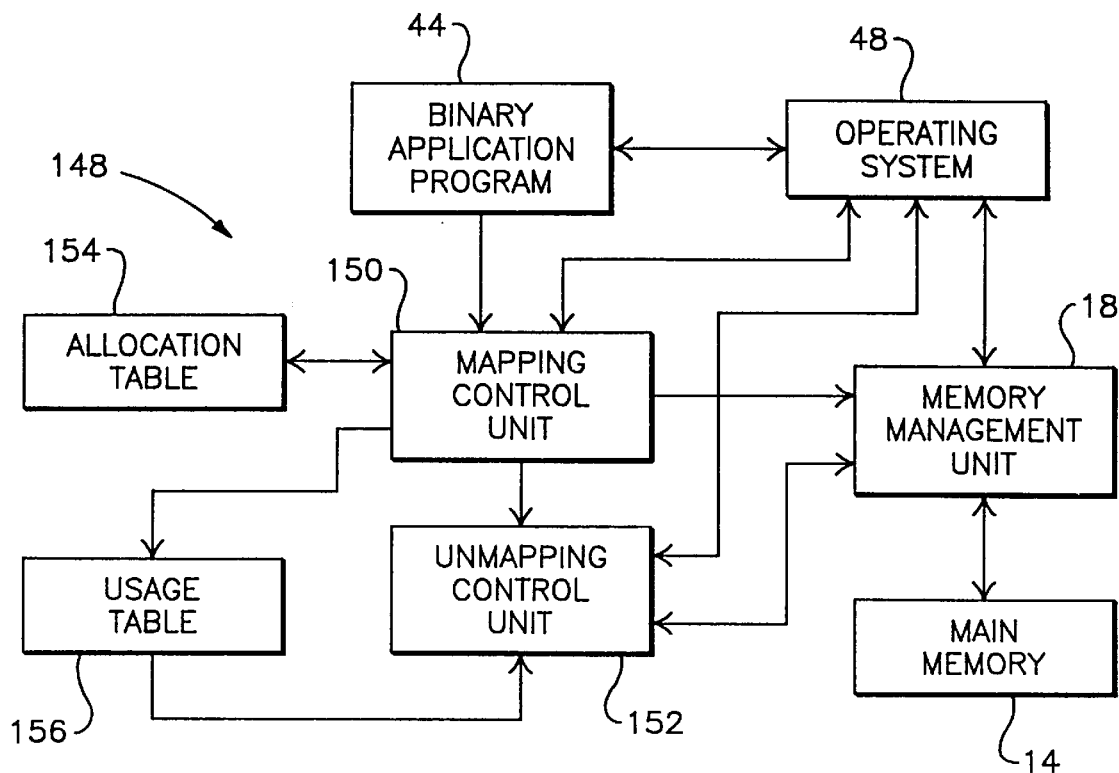
FIG. 18 is a diagram illustrating a memory management structure of the present application binary interface.

With reference being made to FIG. 18, the present invention further comprises a memory mapping system 148 including a VSID range allocator or mapping control unit 150, and a VSID range reclaimer or unmapping control unit 152, that operatively interact with the memory management unit 18 and the operating system 48 as described in detail below. The mapping control unit 150 maintains an allocation table 154 and a usage table 156.

The aspect of the present invention as illustrated in FIG. 18 is based on the realization that the VSID ranges and their corresponding PTEs do not have to be invalidated or deleted until they are required for use by a new process. The virtual address space as utilized in the manner illustrated in FIG. 17 comprises over one million VSID ranges or address spaces, each of which is assigned to one process. Assuming that new VSID range is allocated every two seconds, approximately 6 days of continuous system operation would be required to allocate all of the VSID ranges.

When the operating system needs to create new mappings in a PTEG, it may delete and reuse stale PTEs. However, before reusing a VSID range, it must remove all uses of that VSID range from the page table. The present invention performs the housekeeping operation of intermittently unmapping or deleting all remaining stale PTEs at intervals of several days, rather than approximately every 2 seconds as in the prior art. Thus, rather. than using ⅓ second of processing time every 2 seconds as in the prior art, the present invention uses ⅓ second of processing time every 6 days to achieve the same result. The increase in operating speed and efficiency provided by the present invention is substantial.

Figure 19:
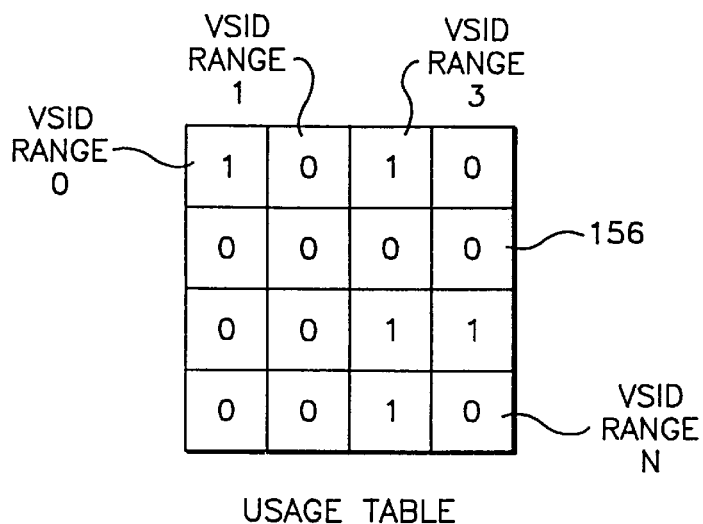
FIG. 19 is a diagram illustrating a usage table of the structure of FIG. 18.

The usage table 156 is illustrated in FIG. 19, and is constituted by a bit map having a one bit entry for each VSID range (address space). The bit for each VSID range is set to "1" if the corresponding VSID range is being used by a current process, and is set to "0" if the VSID range is not currently in use.

The mapping control unit 150 initializes all bits in the usage table 156 to "0", sets a bit to "1" upon allocation of a corresponding VSID range to a process, and sets the bit to "0" after the process has terminated.

In this manner, the usage table 156 comprises a list of all VSID ranges in the 52-bit virtual address space, indicating which VSID ranges are currently in use. Since there are $2^{20}$=1,048,576 VSID ranges, and each byte consists of $2^3$=8 bits, the size of the usage table 156 is $2^{20}/2^3=2^{17}$ bytes=128 kilobytes. Alternatively, it is within the scope of the invention to use only a part of the VSID space.

Figure 20:
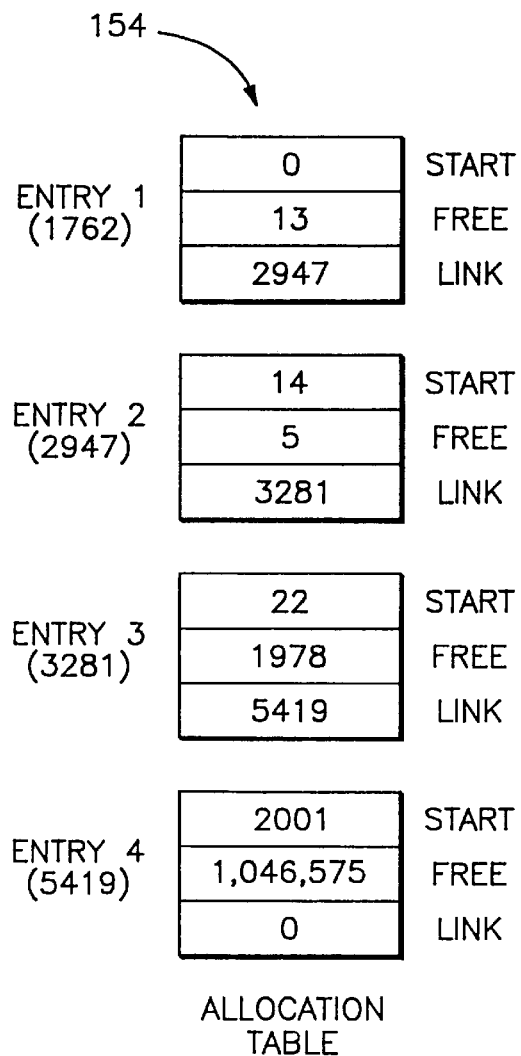
FIG. 20 is a diagram illustrating an allocation table of the structure of FIG. 18.

As illustrated in FIG. 20, the allocation table 154 comprises a linked list of entries, which are kept sorted by VSID range and coalesced. Each entry comprises a number (START) of the first VSID range in a block of contiguous unallocated VSID ranges, a number (FREE) of unallocated VSID ranges in the contiguous block starting with the value START and a pointer (LINK) to the next entry. The entries need not be stored contiguously in memory, but can reside at any addresses since they are linked together by the pointers LINK.

Arbitrary memory locations and values have been assigned to the entries in FIG. 20 for purpose of description. In the illustrated example, VSID ranges 13, 19, 20, 21 and 2,000 have been allocated, and the remaining VSID ranges have not been allocated.

Although not explicitly illustrated, the mapping control unit 150 maintains a pointer to the starting address of the first entry. ENTRY 1 starts at memory address, 1,762 (the pointer address), and lists 13 unallocated VSID ranges. The START value (first unallocated VSID range) in ENTRY 1 is 0, the FREE value (number of contiguous unallocated VSID ranges starting with the START value) is 13 and the LINK value (starting address of next-entry) is 2,947.

ENTRY 2 similarly lists 5 VSID ranges starting with VSID range 14 as being unallocated, and points to ENTRY 3 at address 3,281. ENTRY 3 lists 1,978 unallocated VSID ranges beginning at VSID range 22, and points to ENTRY 4 at address 5,419. ENTRY 4 lists 1,046,575 unallocated VSID ranges, starting at 2,001. The LINK value for ENTRY 4 is zero, indicating that ENTRY 4 is the last entry in the allocation table 154.

It will be understood that the information in the allocation table 154 and the usage table may, but do not necessarily correspond. A VSID range that has been allocated to a process will be indicated as allocated in the allocation table 154 until all VSID ranges have been allocated, even if the corresponding process has terminated and the VSID range is listed as not currently in use in the usage table 156.

The mapping control unit 150 allocates or selects VSID ranges or address spaces for new processes from the allocation table 154 in sequential order in an on-demand manner, and controls the memory management unit 18 to map the VSID ranges to physical addresses by creating PTEs for the corresponding VSID ranges. As each PTE is created, it is marked as valid by setting the valid V bit to "1" as described above.

As each VSID range is allocated, the allocation table 154 and the usage table 156 are appropriately updated. The allocation table 154 is updated by altering the corresponding entry. This is performed by incrementing the START value and decrementing the FREE value for the entry as each VSID range is allocated, eliminating the entry when the free value becomes 0. The usage table 156 is updated by changing the bit for the corresponding VSID range from 0 to 1.

For example, assuming that VSID range 0 is being newly allocated and the allocation table 154 has the status as illustrated in FIG. 20, the START value in ENTRY 1 is incremented from 0 to 1, and the FREE value is decremented from 13 to 12. The bit for VSID range 0 in the usage table 156 is changed from "0" to "1".

When the VSID ranges in a particular entry in the allocation table have all been allocated, the mapping control unit 150 deletes the entry and sets the pointer to point to the address of the beginning of the next entry. As a natural consequence of this operation, the entries are deleted in sequential order from the lowest to the highest.

This process continues until all VSID ranges, including those corresponding to processes that have and have not terminated, are allocated. The mapping control unit 150 knows when this occurs because all entries in the allocation table will have been deleted.

The unmapping control unit 152 then performs the operation of unmapping or deleting the mappings for all, or a selected subset of terminated (not current) processes as indicated in the usage table 156, to free the corresponding VSID ranges and physical addresses for use by new processes.

Figure 21:
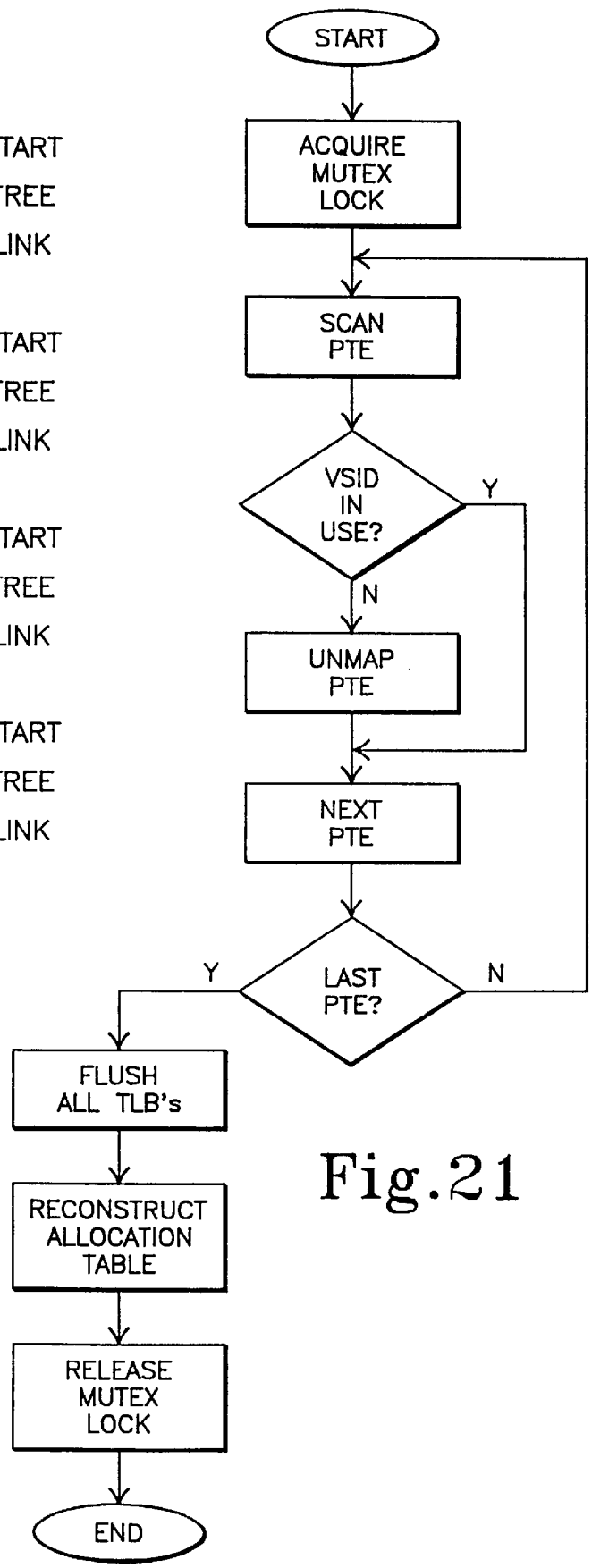
FIG. 21 is a flowchart illustrating the operation of the structure of FIG. 18.

As illustrated in the flowchart of FIG. 21, the unmapping control unit 152 first acquires a mutual exclusion (mutex) lock from the operating system 48 that prevents any other operation from accessing the allocation table 154 and the usage table 156. The unmapping control unit 152 then scans all PTEs in the page table in sequential order.

As each PTE is examined, the VSID that is contained in bits 1 to 24 of WORD 0 (please refer to FIG. 16) of the PTE is extracted. The usage table 156 is then accessed to determine if the corresponding bit for the VSID is "1" (the VSID is allocated to a current process that has not terminated), or "0" (the VSID is "stale", having been allocated to a process that has terminated).

If the bit in the usage table is "1", the PTE is not unmapped. If, however, the bit is "0", the unmapping control unit 152 unmaps the PTE. This is done by changing the valid V bit in the PTE from "1" to "0".

After all PTEs in the page table have been scanned and processed as described above, the unmapping control unit 152 flushes or clears all Translation Look-aside Buffers (TLBs), which are not illustrated in the drawing, and reconstructs the allocation table based on the bit entries in the usage table 156.

The mapping control unit 150 reconstructs the allocation table 154 by scanning the usage table 156 to find the first group of contiguous "0" bits (corresponding to the first group of invalid or free VSID ranges), and creating a first entry having its START value equal to the first free VSID range, its FREE value equal to the number of contiguous free VSID ranges starting with the first free VSID range, and its LINK value set to 0.

The unit 150 then locates the next free VSID range in the usage table 156, creates a second entry for the allocation table 150 that is pointed to from the first entry, and continues this process until the allocation table 150 has been reconstructed by creating an entry for each group of contiguous free VSID ranges. After the allocation table 150 has been reconstructed, the mutex lock is released and the mapping control unit 150 is allowed to continue allocating new VSID ranges for mapping by the memory management unit 18.

Since the unmapping control unit 152 unmaps stale PTEGs in the page table only after all virtual address spaces have been allocated to processes, unmapping operations will occur only at long intervals such as several days. This aspect of the present application binary interface 46 substantially reduces the overhead associated with memory management and increases the operating speed and efficiency of the system.

Various modifications will become possible for those skilled in the art after receiving the teachings of the present disclosure without departing from the scope thereof.

I claim:

1. A memory mapping system for a computer:

the computer comprising:
　a memory for storing programs including at least one current program and a plurality of terminated programs;
　a processor for executing said programs;
　a memory management unit for mapping virtual address elements in a virtual address space that is addressed by said programs to physical addresses in the memory;

the memory mapping system comprising:
　a mapping control unit for controlling the memory management unit to map selected virtual address elements for access by the said programs to physical addresses;
　an unmapping control unit for intermittently controlling the memory management unit to unmap physical addresses corresponding to said selected virtual address elements for the terminated programs.

2. A system as in claim 1, further comprising a usage table that is maintained by the mapping control unit for individually indicating whether access by said programs to said selected virtual address elements has been completed.

3. A system as in claim 2, in which the usage table comprises a bit table having a bit entry for each virtual address element, said bit entry having a first value if said virtual address element has not been mapped, said first value if said virtual address element has been mapped and access by said programs thereto has been completed, and a second value if said virtual address element has been mapped and access by said programs thereto has not been completed.

4. A system as in claim 2, in which the unmapping control unit controls the memory management unit to sequentially unmap physical addresses except those whose corresponding virtual address elements are listed in the usage table as corresponding to the at least one current program.

5. A system as in claim 4, further comprising an allocation table that is maintained by the mapping control unit for selecting said virtual address elements for mapping by the memory management unit.

6. A system as in claim 5, in which the allocation table comprises a list of unselected groups of contiguous virtual address elements.

7. A system as in claim 6, in which the mapping control unit selects new virtual address elements for mapping by the memory management unit that are indicated in the allocation table as being unselected, and updates the allocation table to indicate said new virtual address elements as being selected.

8. A system as in claim 1, in which the mapping control unit controls the memory management unit to map selected virtual address elements in the form of ranges of virtual addresses, with each range comprising a predetermined number of contiguous virtual addresses.

9. A system as in claim 1, in which:
　the memory management unit comprises a page table for storing mappings of said virtual address elements to said physical addresses:
　the unmapping unit controls the memory management unit to unmap physical addresses corresponding to said selected virtual address elements for the terminated programs by deleting said mappings from said page table.

10. A method of mapping memory in a computer:

the computer comprising:
　a memory for storing programs including at least one current program and a plurality of terminated programs;
　a processor for executing said programs;
　a memory management unit for mapping virtual address elements in a virtual address space that is addressed by said programs to physical addresses in the memory;

the method comprising the steps of:
　(a) controlling the memory management unit to map selected virtual address elements for access by said programs to physical addresses;
　(b) intermittently controlling the memory management unit to unmap physical addresses corresponding to said selected virtual address elements for the terminated programs.

11. A method as in claim 10, in which step (a) comprises maintaining a usage table for individually indicating whether access by said programs to said selected virtual address elements has been completed.

12. A method as in claim 11, in which step (a) comprises the substeps of:
　(c) providing the usage table as a bit table having a bit entry for each virtual address element;
　(d) setting said bit entry to a first value if said virtual address element has not been mapped;
　(e) setting said bit entry to said first value if said virtual address element has been mapped and access by said programs thereto has been completed;

(f) setting said bit entry to a second value if said virtual address element has been mapped and access by said programs thereto has not been completed.

13. A method as in claim 11, in which step (b) comprises controlling the memory management unit to sequentially unmap physical addresses except those whose corresponding virtual address elements are listed in the usage table as corresponding to the at least one current program.

14. A method as in claim 13, in which step (a) further comprises maintaining an allocation table for selecting said virtual address elements for mapping by the memory management unit.

15. A method as in claim 14, in which step (a) further comprises maintaining the allocation table as including a list of unselected groups of contiguous virtual address elements.

16. A method as in claim 15, in which step (a) further comprises selecting new virtual address elements for mapping by the memory management unit that are indicated in the allocation table as being unselected, and updates the allocation table to indicate said new virtual address elements as being selected.

17. A method as in claim 10, in which step (a) further comprises controlling the memory management unit to map selected virtual address elements in the form of ranges of virtual addresses, with each range comprising a predetermined number of contiguous virtual addresses.

18. A programmed digital computer comprising:
a memory;
a processor;
a plurality of binary programs including at least one current program and a plurality of terminated programs that are stored in the memory;
a memory management unit for mapping virtual address elements in a virtual address space that is addressed by said programs to physical addresses in the memory;
a memory mapping system including:
a mapping control unit for controlling the memory management unit to map selected virtual address elements for access by the said programs to physical addresses;
an unmapping control unit for intermittently controlling the memory management unit to unmap physical addresses corresponding to said selected virtual address elements for the terminated programs.

19. A computer as in claim 18, further comprising a usage table that is maintained by the mapping control unit for individually indicating whether access by said programs to said selected virtual address elements has been completed.

20. A computer as in claim 19, in which the usage table comprises a bit table having a bit entry for each virtual address element, said bit entry having a first value if said virtual address element has not been mapped, said first value if said virtual address element has been mapped and access by said programs thereto has been completed, and a second value if said virtual address element has been mapped and access by said programs thereto has not been completed.

21. A computer as in claim 19, in which the unmapping control unit controls the memory management unit to sequentially unmap physical addresses except those whose corresponding virtual address elements are listed in the usage table as corresponding to the at least one current program.

22. A computer as in claim 21, in which the system further comprises an allocation table that is maintained by the mapping control unit for selecting said virtual address elements for mapping by the memory management unit.

23. A computer as in claim 22, in which the allocation table comprises a list of unselected groups of contiguous virtual address elements.

24. A computer as in claim 23, in which the mapping control unit selects new virtual address elements for mapping by the memory management unit that are indicated in the allocation table as being previously unselected, and updates the allocation table to indicate said new virtual address elements as being selected.

25. A computer as in claim 18, in which the mapping control unit controls the memory management unit to map selected virtual address elements in the form of ranges of virtual addresses, with each range comprising a predetermined number of contiguous virtual addresses.

26. A computer as in claim 18, in which:
the memory management unit comprises a page table for storing mappings of said virtual address elements to said physical addresses;
the unmapping unit controls the memory management unit to unmap physical addresses corresponding to said selected virtual address elements for the terminated programs by deleting said mappings from said page table.

27. A memory mapping system for a computer:
the computer comprising:
a memory for storing a program;
a processor for executing the program;
a memory management unit for mapping virtual address elements in a virtual address space that is addressed by the program to physical addresses in the memory;
the memory mapping system comprising:
a mapping control unit for controlling the memory management unit to map selected virtual address elements for access by the program to physical addresses;
an unmapping control unit for intermittently controlling the memory management unit to unmap physical addresses corresponding to said selected virtual address elements for which said access by the program has been completed;
a usage table that is maintained by the mapping control unit for individually indicating whether access by the program to said selected virtual address elements has been completed;
in which the unmapping control unit controls the memory management unit to sequentially unmap physical addresses except those whose corresponding virtual address elements are listed in the usage table as indicating that access by the program has not been completed;
further comprising an allocation table that is maintained by the mapping control unit for selecting said virtual address elements for mapping by the memory management unit, in which:
the allocation table comprises a list of unselected groups of contiguous virtual address elements;
the mapping control unit selects new virtual address elements for mapping by the memory management unit that are indicated in the allocation table as being unselected, and updates the allocation table to indicate said new virtual address elements as being selected;
the unmapping control unit controls the memory management unit to sequentially unmap physical addresses except those whose corresponding virtual address elements are listed in the usage table as indicating that access by the program has not been completed when all virtual address elements in the allocation table are indicated as being selected.

28. A memory mapping system for a computer:

the computer comprising:
  a memory for storing a program;
  a processor for executing the program;
  a memory management unit for mapping virtual address elements in a virtual address space that is addressed by the program to physical addresses in the memory;

the memory mapping system comprising:
  a mapping control unit for controlling the memory management unit to map selected virtual address elements for access by the program to physical addresses;
  an unmapping control unit for intermittently controlling the memory management unit to unmap physical addresses corresponding to said selected virtual address elements for which said access by the program has been completed;
  a usage table that is maintained by the mapping control unit for individually indicating whether access by the program to said selected virtual address elements has been completed;
in which the unmapping control unit controls the memory management unit to sequentially unmap physical addresses except those whose corresponding virtual address elements are listed in the usage table as indicating that access by the program has not been completed;
further comprising an allocation table that is maintained by the mapping control unit for selecting said virtual address elements for mapping by the memory management unit, in which:
  the allocation table comprises a list of unselected groups of contiguous virtual address elements;
  the mapping control unit selects new virtual address elements for mapping by the memory management unit that are indicated in the allocation table as being unselected, and updates the allocation table to indicate said new virtual address elements as being selected;
  the unmapping control unit controls the memory management unit to sequentially unmap physical addresses except those whose corresponding virtual address elements are listed in the usage table as indicating that access by the program has not been completed when a predetermined subset of virtual address elements in the allocation table are indicated as being selected.

29. A method of mapping memory in a computer:

the computer comprising:
  a memory for storing a program;
  a processor for executing the program;
  a memory management unit for mapping virtual address elements in a virtual address space that is addressed by the program to physical addresses in the memory;

the method comprising the steps of:
  (a) controlling the memory management unit to map selected virtual address elements for access by the program to physical addresses;
  (b) intermittently controlling the memory management unit to unmap physical addresses corresponding to said selected virtual address elements for which said access by the program has been completed, in which:
  step (a) comprises maintaining a usage table for individually indicating whether access by the program to said selected virtual address elements has been completed;
  step (b) comprises controlling the memory management unit to sequentially unmap physical addresses except those whose corresponding virtual address elements are listed in the usage table as indicating that access by the program has not been completed;
  step (a) further comprises maintaining an allocation table for selecting said virtual address elements for mapping by the memory management unit;
  step (a) further comprises maintaining the allocation table as including a list of unselected groups of contiguous virtual address elements;
  step (a) further comprises selecting new virtual address elements for mapping by the memory management unit that are indicated in the allocation table as being unselected, and updates the allocation table to indicate said new virtual address elements as being selected;
  step (b) further comprises controlling the memory management unit to sequentially unmap physical addresses except those whose corresponding virtual address elements are listed in the usage table as indicating that access by the program has not been completed when all virtual address elements in the allocation table are indicated as being selected.

30. A method of mapping memory in a computer:

the computer comprising:
  a memory for storing the program;
  a processor for executing the program;
  a memory management unit for mapping virtual address elements in a virtual address space that is addressed by the program to physical addresses in the memory;

the method comprising the steps of:
  (a) controlling the memory management unit to map selected virtual address elements for access by the program to physical addresses;
  (b) intermittently controlling the memory management unit to unmap physical addresses corresponding to said selected virtual address elements for which said access by the program has been completed, in which:
  step (a) comprises maintaining a usage table for individually indicating whether access by the program to said selected virtual address elements has been completed;
  step (b) comprises controlling the memory management unit to sequentially unmap physical addresses except those whose corresponding virtual address elements are listed in the usage table as indicating that access by the program has not been completed;
  step (a) further comprises maintaining an allocation table for selecting said virtual address elements for mapping by the memory management unit;
  step (a) further comprises maintaining the allocation table as including a list of unselected groups of contiguous virtual address elements;
  step (a) further comprises selecting new virtual address elements for mapping by the memory management unit that are indicated in the allocation table as being unselected, and updates the allocation table to indicate said new virtual address elements as being selected;

step (b) further comprises controlling the memory management unit to sequentially unmap physical addresses except those whose corresponding virtual address elements are listed in the usage table as indicating that access by the program has not been completed when a predetermined subset of virtual address elements in the allocation table are indicated as being selected.

31. A programmed digital computer, comprising:

a memory;

a processor;

a binary program that is stored in the memory;

a memory management unit for mapping virtual address elements in a virtual address space that is addressed by the program to physical addresses in the memory;

the memory mapping system comprising:

a mapping control unit for controlling the memory management unit to map selected virtual address elements for access by the program to physical addresses;

an unmapping control unit for intermittently controlling the memory management unit to unmap physical addresses corresponding to said selected virtual address elements for which said access by the program has been completed;

a usage table that is maintained by the mapping control unit for individually indicating whether access by the program to said selected virtual address elements has been completed;

in which the unmapping control unit controls the memory management unit to sequentially unmap physical addresses except those whose corresponding virtual address elements are listed in the usage table as indicating that access by the program has not been completed;

further comprising an allocation table that is maintained by the mapping control unit for selecting said virtual address elements for mapping by the memory management unit, in which:

the allocation table comprises a list of unselected groups of contiguous virtual address elements;

the mapping control unit selects new virtual address elements for mapping by the memory management unit that are indicated in the allocation table as being unselected, and updates the allocation table to indicate said new virtual address elements as being selected;

the unmapping control unit controls the memory management unit to sequentially unmap physical addresses except those whose corresponding virtual address elements are listed in the usage table as indicating that access by the program has not been completed when all virtual address elements in the allocation table are indicated as being selected.

32. A programmed digital computer, comprising:

a memory;

a processor;

a binary program that is stored in the memory;

a memory management unit for mapping virtual address elements in a virtual address space that is addressed by the program to physical addresses in the memory;

the memory mapping system comprising:

a mapping control unit for controlling the memory management unit to map selected virtual address elements for access by the program to physical addresses;

an unmapping control unit for intermittently controlling the memory management unit to unmap physical addresses corresponding to said selected virtual address elements for which said access by the program has been completed;

a usage table that is maintained by the mapping control unit for individually indicating whether access by the program to said selected virtual address elements has been completed;

in which the unmapping control unit controls the memory management unit to sequentially unmap physical addresses except those whose corresponding virtual address elements are listed in the usage table as indicating that access by the program has not been completed;

further comprising an allocation table that is maintained by the mapping control unit for selecting said virtual address elements for mapping by the memory management unit, in which:

the allocation table comprises a list of unselected groups of contiguous virtual address elements;

the mapping control unit selects new virtual address elements for mapping by the memory management unit that are indicated in the allocation table as being unselected, and updates the allocation table to indicate said new virtual address elements as being selected; and the unmapping control unit controls the memory management unit to sequentially unmap physical addresses except those whose corresponding virtual address elements are listed in the usage table as indicating that access by the program has not been completed when a predetermined subset of virtual address elements in the allocation table are indicated as being selected.

\* \* \* \* \*